(12) United States Patent
Zhao

(10) Patent No.: US 6,639,707 B2
(45) Date of Patent: Oct. 28, 2003

(54) TANDEM INTERLEAVER

(75) Inventor: Bin Zhao, Irvine, CA (US)

(73) Assignee: Cirvine Corporation, Irvine, CA (US)

( * ) Notice: Subject to any disclaimer, the term of this patent is extended or adjusted under 35 U.S.C. 154(b) by 0 days.

(21) Appl. No.: 10/016,362

(22) Filed: Nov. 30, 2001

(65) Prior Publication Data

US 2003/0007232 A1 Jan. 9, 2003

Related U.S. Application Data

(63) Continuation-in-part of application No. 09/891,794, filed on Jun. 25, 2001.

(51) Int. Cl.[7] .............................. G02F 1/03; G02F 1/07
(52) U.S. Cl. ..................... 359/256; 359/495; 359/497
(58) Field of Search ................................ 359/256, 495, 359/250, 278, 279, 288, 487

(56) References Cited

U.S. PATENT DOCUMENTS

| | | | |
|---|---|---|---|
| 4,247,166 A | 1/1981 | Yeh | |
| 4,500,178 A | 2/1985 | Yeh | |
| 4,531,197 A | 7/1985 | Lin | |
| 4,548,479 A | 10/1985 | Yeh | |
| 4,685,773 A | 8/1987 | Carlsen et al. | |
| 5,013,140 A | 5/1991 | Healey et al. | |
| 5,062,694 A | 11/1991 | Blair | |
| 5,347,378 A | 9/1994 | Handschy | |
| 5,414,540 A | 5/1995 | Patel et al. | |
| 5,414,541 A | 5/1995 | Patel et al. | |
| 5,471,340 A | 11/1995 | Cheng et al. | |
| 5,574,596 A | 11/1996 | Cheng | |
| 5,606,439 A | 2/1997 | Wu | |
| 5,682,446 A | 10/1997 | Pan et al. | |
| 5,694,233 A | 12/1997 | Wu et al. | |
| 5,724,165 A | 3/1998 | Wu | |
| 5,771,120 A | 6/1998 | Bergmann | |
| 5,774,264 A | 6/1998 | Konno et al. | |
| 5,818,981 A | 10/1998 | Pan et al. | |
| 5,867,291 A | 2/1999 | Wu et al. | |
| 5,978,116 A | 11/1999 | Wu et al. | |
| 6,005,697 A | 12/1999 | Wu et al. | |
| 6,049,427 A | 4/2000 | Bettman | |
| 6,134,031 A | 10/2000 | Nishi et al. | |
| RE37,044 E | 2/2001 | Wu | |
| 6,208,442 B1 | 3/2001 | Liu et al. | |
| 6,212,313 B1 * | 4/2001 | Li | ............... 385/24 |
| 6,222,958 B1 | 4/2001 | Paiam | |
| 6,256,433 B1 | 7/2001 | Luo et al. | |
| 6,421,177 B1 * | 7/2002 | Leyva et al. | ............... 359/495 |
| 6,441,960 B1 * | 8/2002 | Wang et al. | ............... 359/497 |
| 6,441,961 B1 * | 8/2002 | Hou et al. | ............... 359/497 |

OTHER PUBLICATIONS

Pp. 10–29 from book believed to be entitled *Electromagnetic Theory*, No further information on book is available.
Carl F. Buhrer; *Synthesis and tuning of high–order Solc–type birefringent filters*, Applied Optics, Apr. 20, 1994, vol. 33, No. 12, pp. 2249–2254.

(List continued on next page.)

*Primary Examiner*—Ricky Mack
*Assistant Examiner*—Brandi N Thomas
(74) *Attorney, Agent, or Firm*—Norman E. Carte

(57) ABSTRACT

A low dispersion comb filter or interleaver comprises a first birefringent element assembly having at least one birefringent element and a second birefringent element assembly having at least one other birefringent element. The first birefringent element assembly and the second birefringent element assembly are configured so as to cooperate with one another in a manner which mitigates dispersion of the interleaver. By aligning the polarization directions of the odd channels and the even channels so as to be parallel with respect to one another prior to entering the second birefringent element assembly, zero or nearly zero dispersion is obtained simultaneously for both the odd and even channels.

5 Claims, 16 Drawing Sheets

OTHER PUBLICATIONS

Tatsuya Kimura, Masatoshi Saruwatari; *Temperature Compensation of Birefringent Optical Filters;* Proceeding Letters, Aug. 1971, pp. 1273–1274.

Carl F. Buhrer; *Four waveplate dual tuner for birefringent filters and multiplexers; Applied Optics,* Sep. 1, 1987, vol. 26, No. 17, pp. 3628–3632.

P. Melman, W. J. Carlsen, B. Foley; *Tunable Birefringent Wavelength–Division Multiplexer/Demultiplexer, Electronics Letters,* Jul. 18, 1985, vol. 21, No. 15, pp. 634 and 635.

Yohji Fujii; *Tunable wavelength multi/demultiplexer using a variable retardation phase plate; Applied Optics,* Aug. 20, 1990, vol. 29, No. 29.

S.E. Harris, E.O. Ammann, I. C. Chang; *Optical Network Synthesis Using Birefringent Crystals.\* I. Synthesis of Lossless Networks of Equal–Length Crystals, Journal of the Optical Society of America,* Oct. 1964, vol. 564, No. 10, pp. 1267–1279.

Tatsuya Kimura, Masatoshi Saruwatari, and Kenju Otsuka; *Birefringent Branching Filters for Wideband Optical FDM Communications; Applied Optics,* Feb. 1973, vol. 12, No. 2, pp. 373 to 379.

Godfrey R. Hill; *Wavelength Domain Optical Network Techniques; Proceedings of the IEEE,* Jan. 1989, vol. 77, No. 1, pp. 121 to 132.

J. M. Senior, S.D. Cusworth; *Devices for Wavelength Multiplexing and Demultiplexing; IEE Proceedings,* Jun. 1989, vol. 136, Pt. J. No. 3, pp. 183–202.

\* cited by examiner

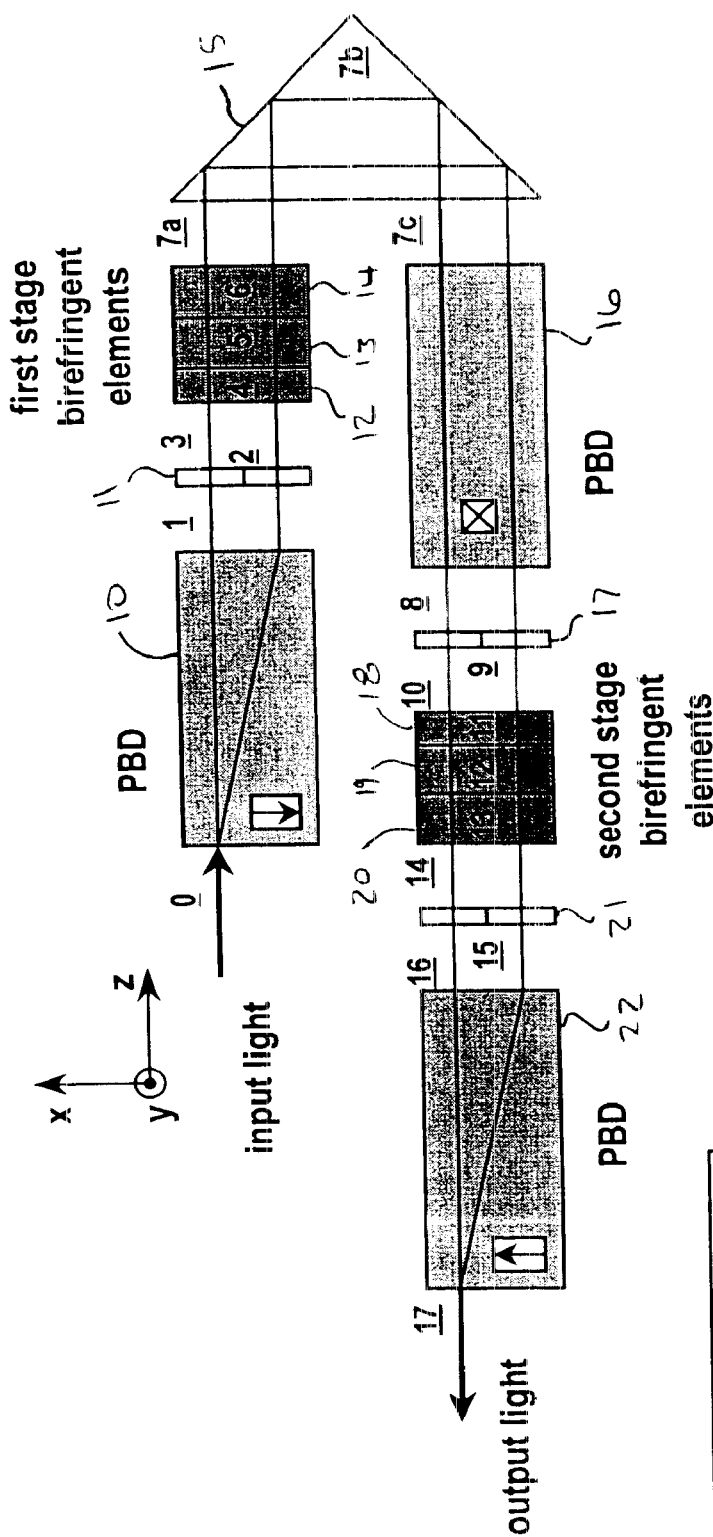
FIG. 19
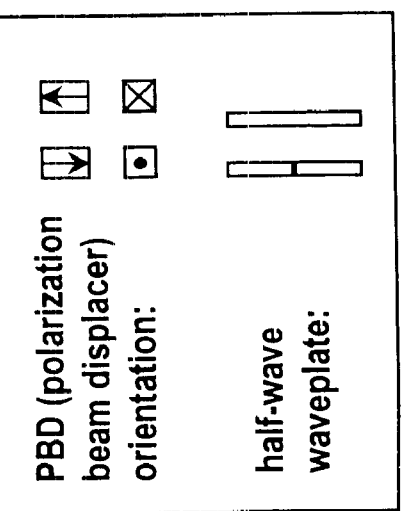

TANDEM INTERLEAVER

CROSS-REFERENCE TO RELATED APPLICATIONS

This patent application is a continuation-in-part application of application Ser. No. 09/891,794, filed Jun. 25, 2001 and entitled TANDOM COMB, FILTER, the entire contents of which are hereby expressly incorporated by reference.

FIELD OF THE INVENTION

The present invention relates generally to optical devices and relates more particularly to a dispersion mitigating comb filter and interleaver for optical communications and the like.

BACKGROUND OF THE INVENTION

Optical communication systems which utilize wavelength-division multiplexing (WDM) and dense wavelength-division multiplexing (DWDM) technologies are well known. According to both wavelength-division multiplexing and dense wavelength-division multiplexing, a plurality of different wavelengths of light, preferably infrared light, are transmitted via a single medium such as an optical fiber. Each wavelength corresponds to a separate channel and carries information generally independently with respect to the other channels. The plurality of wavelengths (and consequently the corresponding plurality of channels) are transmitted simultaneously without interference with one another, so as to substantially enhance the transmission bandwidth of the communication system. Thus, according to wavelength-division multiplexing and dense wavelength-division multiplexing technologies, a much greater amount of information can be transmitted than is possible utilizing a single wavelength optical communication system.

The individual channels of a wavelength-division multiplexed or dense wavelength-division multiplexed signal must be selected or separated from one another at a receiver in order to facilitate detection and demodulation thereof. This separation or demultiplexing process can be performed or assisted by a comb filter or an interleaver. A similar device facilitates multiplexing of the individual channels by a transmitter.

It is important that the interleaver separate the individual channels sufficiently so as to mitigate undesirable crosstalk therebetween. Crosstalk occurs when channels overlap, i.e., remain substantially unseparated, such that some portion of one or more non-selected channels remains in combination with a selected channel. As those skilled in the art will appreciate, such crosstalk interferes with the detection and/or demodulation process. Generally, the effects of crosstalk must be compensated for by undesirably increasing channel spacing and/or reducing the communication speed, so as to facilitate reliable detection/demodulation of the signal.

However, as channel usage inherently increases over time, the need for efficient utilization of available bandwidth becomes more important. Therefore, it is highly undesirable to increase channel spacing and/or to reduce communication speed in order to compensate for the effects of crosstalk. Moreover, it is generally desirable to decrease channel spacing and to increase communication speed so as to facilitate the communication of a greater quantity of information utilizing a given bandwidth.

Modem dense wavelength-division multiplexed (DWDM) optical communications and the like require that network systems offer an ever-increasing number of channel counts, thus mandating the use of a narrower channel spacing in order to accommodate the increasing number of channel counts. The optical interleaver, which multiplexes and demultiplexes optical channels with respect to the physical media, i.e., optical fiber, offers a potential upgrade path, so as to facilitate scalability in both channel spacing and number of channel counts in a manner which enhances the performance of optical communication networks.

As a multiplexer, an interleaver can combine two streams of optical signals, wherein one stream contains odd channels and the other stream contains even channels, into a single, more densely spaced optical signal stream. As a demultiplexer, an interleaver can separate a dense signal stream into two, wider spaced streams, wherein one stream contains the odd channels and the other stream contains the even channels. Thus, the interleaver offers scalability which allows contemporary communication technologies that perform well at wider channel spacing to address narrower, more bandwidth efficient, channel spacings.

There are four basic types of interleavers suitable for multiplexing and demultiplexing optical signals. These include birefringent filters, thin-film dielectric devices, planar waveguides, and fiber-based devices. All of these contemporary interleaving technologies suffer from substantial limitations with respect to channel spacing, dispersion, insertion loss, channel isolation, temperature stability, cost, reliability and flexibility. For example, most commercially available interleavers provide only 100 GHz and 50 GHz channel spacings. Reduction of channel spacing to 25 GHz, 12.5 GHz and beyond appears to be difficult and challenging.

Since it is generally impractical and undesirably expensive to provide precise control during manufacturing, the actual wavelength of communication channels and the center wavelength of filters generally tend to mismatch with each other. Precise control of manufacturing processes is difficult because it involves the use of more stringent tolerances which inherently require more accurate manufacturing equipment and more time consuming procedures. The actual wavelength of the communication channel and the center wavelength of the filter also tend to drift over time due to inevitable material and device degradation over time and also due to changes in the optical characteristics of optical components due to temperature changes. Therefore, it is important that the passband be wide enough so as to include a selected signal, even when both the carrier wavelength of the selected signal and the center wavelength of the passband are not precisely matched or aligned during manufacturing and have drifted substantially over time.

Although having a wider filter passband is generally desirable, so as to facilitate the filtering of signals which have drifted somewhat from their nominal center wavelength, the use of such wider pass bands and the consequent accommodation of channel center wavelength drift does introduce the possibility for undesirably large dispersion being introduced into a filtered channel. Typically, the dispersion introduced by a birefringent filter or interleaver increases rapidly as the channel spacing is reduced and as a channel moves away from its nominal center wavelength, as discussed in detail below. Thus, as more channel wavelength error is tolerated in a birefringent filter or interleaver, greater dispersion valves are likely to be introduced.

As those skilled in the art will appreciate, dispersion is the non-linear phase response of an optical device or system wherein light of different wavelengths is spread or dispersed, such that the phase relationship among the different wavelengths varies undesirably as the light passes through the device or system. Such dispersion undesirably distorts optical signals, such as those used in optical communication systems.

The nonlinear phase response or dispersion of WDM and DWDM devices is responsible for signal distortion which results in undesired limitations on channel capability. That is, such dispersion undesirably limits the useable bandwidth of a channel, such as that of a fiber optic communication system. Such undesirable limitation of the bandwidth of a channel in a fiber optic communication system inherently reduces the bit rate of data transmitted thereby.

Contemporary interleavers have dispersion versus wavelength curves which have zero dispersion value at a particular wavelength, such as at nominal channel center wavelength. The dispersion versus wavelength curve of such contemporary interleavers departs drastically from this zero dispersion value as the wavelength moves away from the nominal channel center wavelength. Thus, small deviations in channel center wavelength can result in undesirably large dispersion values being realized.

Since, as discussed in detail above, it is extremely difficult, if not impossible, to maintain the actual channel wavelength precisely at its nominal value, such channel center wavelengths do vary, thereby resulting in undesirably large dispersion values.

As channel spacing is decreased continuously for larger channel count over a given bandwidth, significant and undesirable dispersion appears and can dramatically degrade optical signal quality, particularly in high bit rate optical communication systems.

Thus, there is a need to provide an optical interleaver which can overcome or mitigate at least some of the above-mentioned limitations.

SUMMARY OF THE INVENTION

The present inventions specifically addresses and alleviates the above-mentioned deficiencies associated with the prior art. More particularly, the present invention comprises a comb filter or an interleaver comprising a first birefringent element assembly which comprises at least one birefringent element and a second birefringent element assembly which comprises at least one other birefringent element. The first birefringent element assembly and the second birefringent element assembly are configured so as to cooperate with one another in a manner which mitigates dispersion of the interleaver.

These, as well as other advantages of the present invention, will be more apparent from the following description and drawings. It is understood that changes in the specific structure shown and described may be made within the scope of the claims without departing from the spirit of the invention.

BRIEF DESCRIPTION OF THE DRAWINGS

FIG. 19 is a schematic top view of an interleaver according to the present invention, wherein the first stage (first interleaver element) and second stage (second interleaver element) thereof are not disposed generally along a common axis;

DETAILED DESCRIPTION OF THE INVENTION

Figure 1:
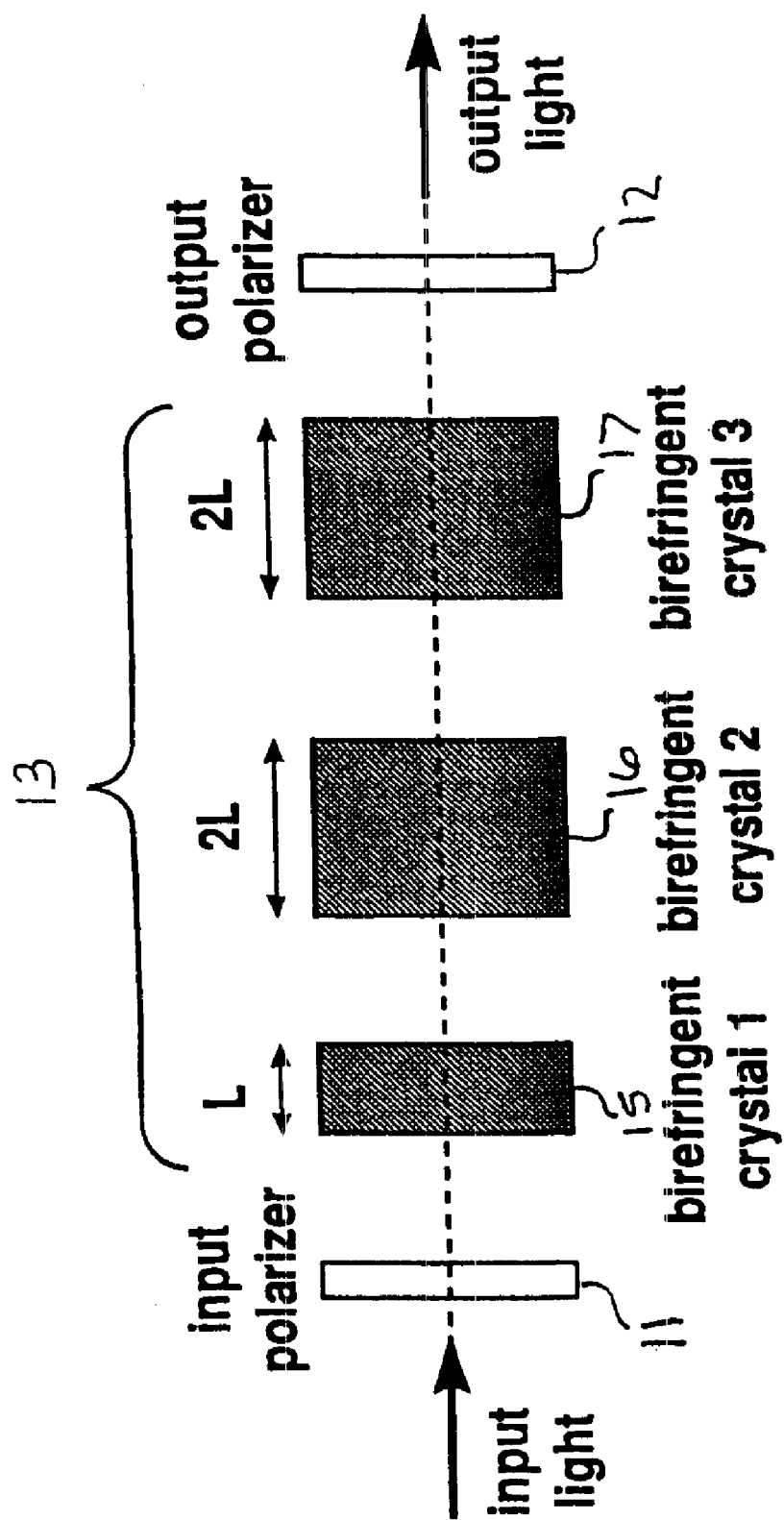
FIG. 1 is a schematic top view of a contemporary birefringent filter or interleaver having a single birefringent element assembly.

The detailed description set forth below in connection with the appended drawings is intended as a description of the presently preferred embodiments of the invention and is not intended to represent the only forms in which the present invention may be constructed or utilized. The description sets forth the functions of the invention and the sequence of steps for constructing and operating the invention in connection with the illustrated embodiments. It is to be understood, however, that the same or equivalent functions and sequences may be accomplished by different embodiments that are also intended to be encompassed with the spirit and scope of the invention.

The description contained herein is directed primarily to the configuration of an interleaver as a demultiplexer. However, as those skilled in the art will appreciate, the present invention may be used in both demultiplexers and multiplexers. The difference between demultiplexers and multiplexers is small and the configuration of the present invention as either desired device is well within the ability of one of the ordinary skill in the art.

Two different reference systems are used in this patent application for the determination of angular orientations. One reference system is used for the determination of the angular orientations of birefringent elements, such as birefringent crystals, with respect to the polarization direction of input light. Another reference system is used for the determination of the angular orientations of birefringent elements and the angular orientations of waveplates with respect to a moving (x, y, z) coordinate system. Thus, for the birefringent element angular orientations, two separate reference systems are utilized. Thus, when reading the detailed description below, it will be very helpful to understand these two reference systems.

When the angular orientation of a birefringent element is discussed, the angular orientation is typically the fast axis of the birefringent element with respect to the polarization direction of incoming light just prior to the incoming light reaching the birefringent element. Determination of the angular orientation is made by observing oncoming light with the convention that the angle is positive if the rotation of the fast axis is clockwise with respect to the polarization direction of the oncoming light and is negative if the rotation is counter-clockwise with respect to the polarization direction of the oncoming light.

If there is a series of birefringent elements, such as in a birefringent filter, the angular orientations of each of the elements of the filter are measured by their fast axes with respect to the polarization direction of incoming light just prior to the incoming light reaching the first birefringent element of the filter. If there are more than one birefringent filters in a sequence, then the angular orientations are determined separately for each birefringent filter (the angular orientations are measured with respect to the polarization direction of incoming light just prior to the incoming light reaching the first birefringent element of each different filter). Thus, each birefringent filter has its own independent reference for the determination of the angular orientations of the birefringent elements thereof.

By the way of contrast, the angular orientation of birefringent elements and angular orientations of waveplates are also measured by the fast axes of birefringent elements and the optic axes of waveplates with respect to the +x axis at that location. However, it is very important to appreciate that the +x axis is part of the moving coordinate system. This coordinate system travels with the light, such that the light is always traveling in the +z direction and such that the +y axis is always up as shown in the drawings. Thus, when the light changes direction, the coordinate system rotates with the +y axis thereof so as to provide a new coordinate system. The use of such a moving coordinate system allows the optical beam states, the birefringent elements, and the waveplates to be viewed in a consistent manner at various locations in the devices, i.e., always looking into the light, and therefore substantially simplifies viewing and analysis of the devices.

Determination of the angular orientations in (x, y, z) coordinate system is made by observing oncoming light with the convention that the angle is positive if the rotation of the corresponding optical axis is counter-clockwise with respect to the +x axis at that location and is negative if the rotation is clockwise with respect to the +x axis at that location (which is consistent with the conventional use of (x, y, z) coordinate system, but which is contrary to the sign convention for determining the angular orientations of birefringent elements with respect to the input polarization direction, as discussed above).

As those skilled in the art will appreciate, an interleaver is an optical device which typically includes at least one birefringent filter. Further, a birefringent filter is one example of a comb filter.

The present invention comprises an interleaver which comprises a first birefringent element assembly (which is a first interleaver element and defines a first stage) which has at least one birefringent element and a second birefringent element assembly (which is a second interleaver element and defines a second stage) which has at least one other birefringent element. The first birefringent element assembly and the second birefringent element assembly are configured so as to cooperate with one another in a manner which mitigates dispersion of the interleaver. More particularly, according to the present invention the first birefringent element assembly and the second birefringent element assembly are configured so as to have dispersion versus wavelength curves which are flipped with respect to one another for both even set and odd set of channels. Thus, each point on the dispersion versus wavelength curve of one of the first and second birefringent element assemblies has a value which is approximately equal in value and opposite in sign with respect to the corresponding point on the curve for the other birefringent element assembly. Of course, when the dispersion versus wavelength curve for the first birefringent element assembly is added to the dispersion versus wavelength curve for the second birefringent element assembly, the net or total dispersion for the two birefringent element assemblies is approximately zero for all wavelengths. That is, dispersion introduced by one birefringent element assembly substantially cancels dispersion introduced by the other birefringent element assembly.

Preferably, such cancellation of the dispersion of one birefringent element assembly by another birefringent element assembly is achieved by providing birefringent element orientations and phase delays in one birefringent element assembly that are related to the angular orientations and phase delays of birefringent elements in the other birefringent element assembly, such that both birefringent element assemblies cooperate with one another in a manner which desirably mitigates dispersion. For example, the first birefringent assembly may be configured so as to comprise birefringent elements which have angular orientations with respect to the polarization direction of incoming light at the input of the first birefringent assembly of (pi wherein i indicates the position of the birefringent element counting in the direction in which light propagates, and the second birefringent element assembly may comprise birefringent elements which have angular orientations with respect to the polarization direction of incoming light at the input of the second birefringent assembly of either $90°+\phi_i$, or $90°-\phi_i$, wherein i again indicates the position of the birefringent element counting in the direction in which light travels.

Preferably, the first and second birefringent element assemblies comprise birefringent crystals. However, those skilled in art will appreciate that various other birefringent devices are likewise suitable. For example, spatial birefringent devices (which utilize first and second paths having different physical path lengths and/or different indices of refraction) are likewise suitable.

Each birefringent element assembly may comprise one, two, three or more birefringent elements, as desired. Those skilled in the art will appreciate that the use of additional birefringent elements generally facilitates the construction of a birefringent filter or interleaver having more enhanced transmission characteristics (such as a flatter and wider passband and/or a deeper and wider stopband).

According to one exemplary embodiment of the low dispersion interleaver of the present invention, the interleaver comprises an input polarization beam displacer configured to provide light to the first birefringent element assembly (which itself at least partially defines an interleaver), an intermediate polarization beam displacer configured to receive light from the first birefringent element assembly and to provide light to the second birefringent element assembly (which itself at least partially defines an interleaver) and an output polarization beam displacer configured to receive light from the second birefringent element assembly. When the birefringent elements of the second birefringent element assembly have phase delays of the same order as the phase delays of the birefringent elements of the first birefringent element assembly, then the first birefringent element assembly provides two orthogonal light components which are aligned with respect to one another prior to being input to the second birefringent element assembly.

Configurations of the angular orientations of the birefringent elements wherein approximately zero dispersion is obtained and wherein the order of the phase delays of the birefringent elements of the second birefringent element assembly differs from the order of the phase delays of the birefringent elements of the first birefringent element assembly are discussed in detail below. Thus, the low dispersion interleaver of the present invention comprises two tandem or sequential interleaver elements.

This exemplary embodiment of the present invention preferably further comprises a first input half-wave waveplate assembly disposed intermediate the input polarization beam displacer and the first birefringent element assembly; a second input half-wave waveplate assembly disposed between intermediate polarization beam displacer and the second birefringent element assembly; and an output half-wave waveplate assembly disposed intermediate the second birefringent element assembly and the output polarization beam displacer.

Figure 2:
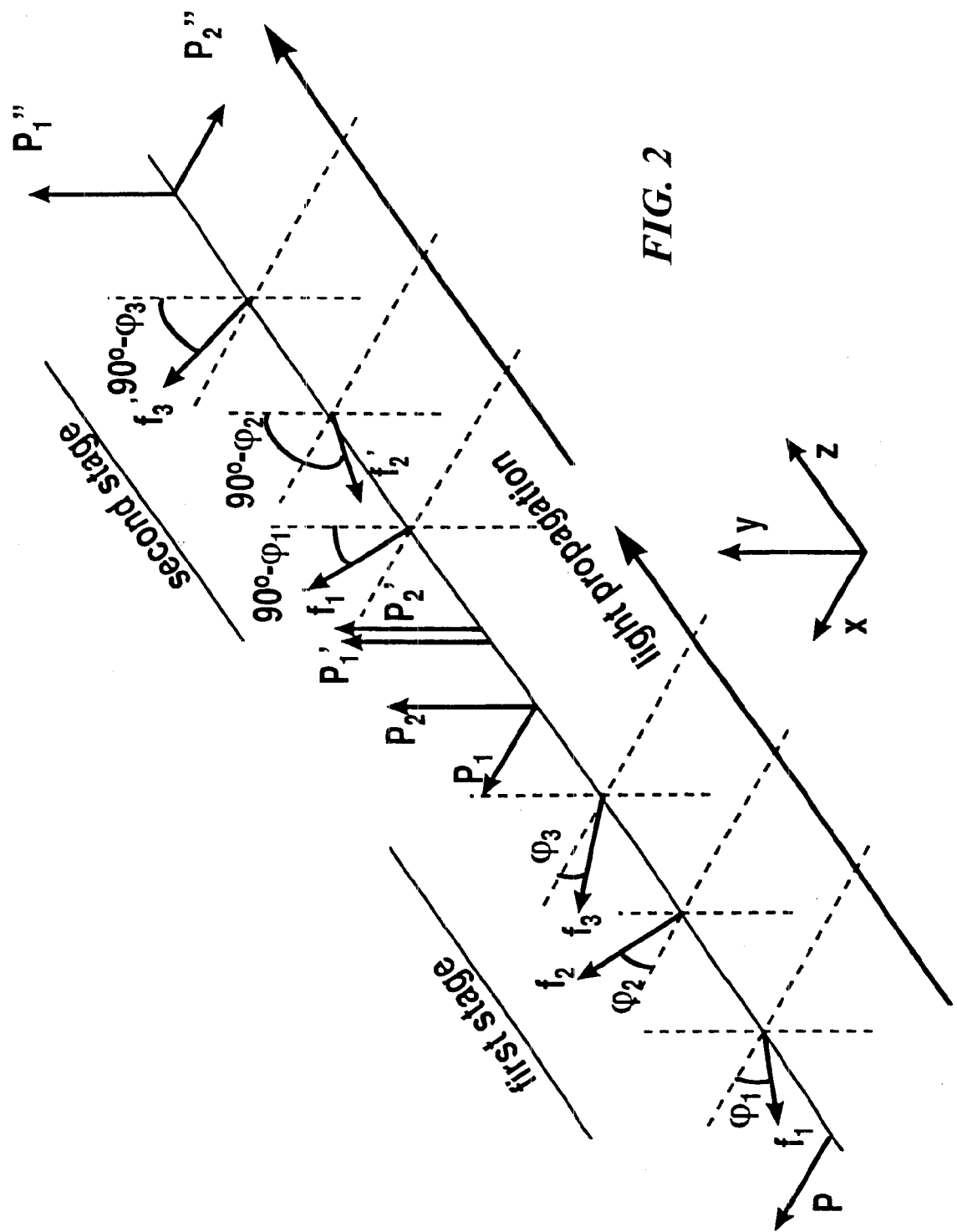
FIG. 2 is a schematic illustration of exemplary birefringent element orientations for the first stage (first interleaver element) and the second stage (second interleaver element) of an interleaver constructed according to one embodiment of the present invention, wherein the polarization direction of the first and second components entering the second stage are aligned with a polarization direction of a second one of the two components output from the first stage.
Figure 3:
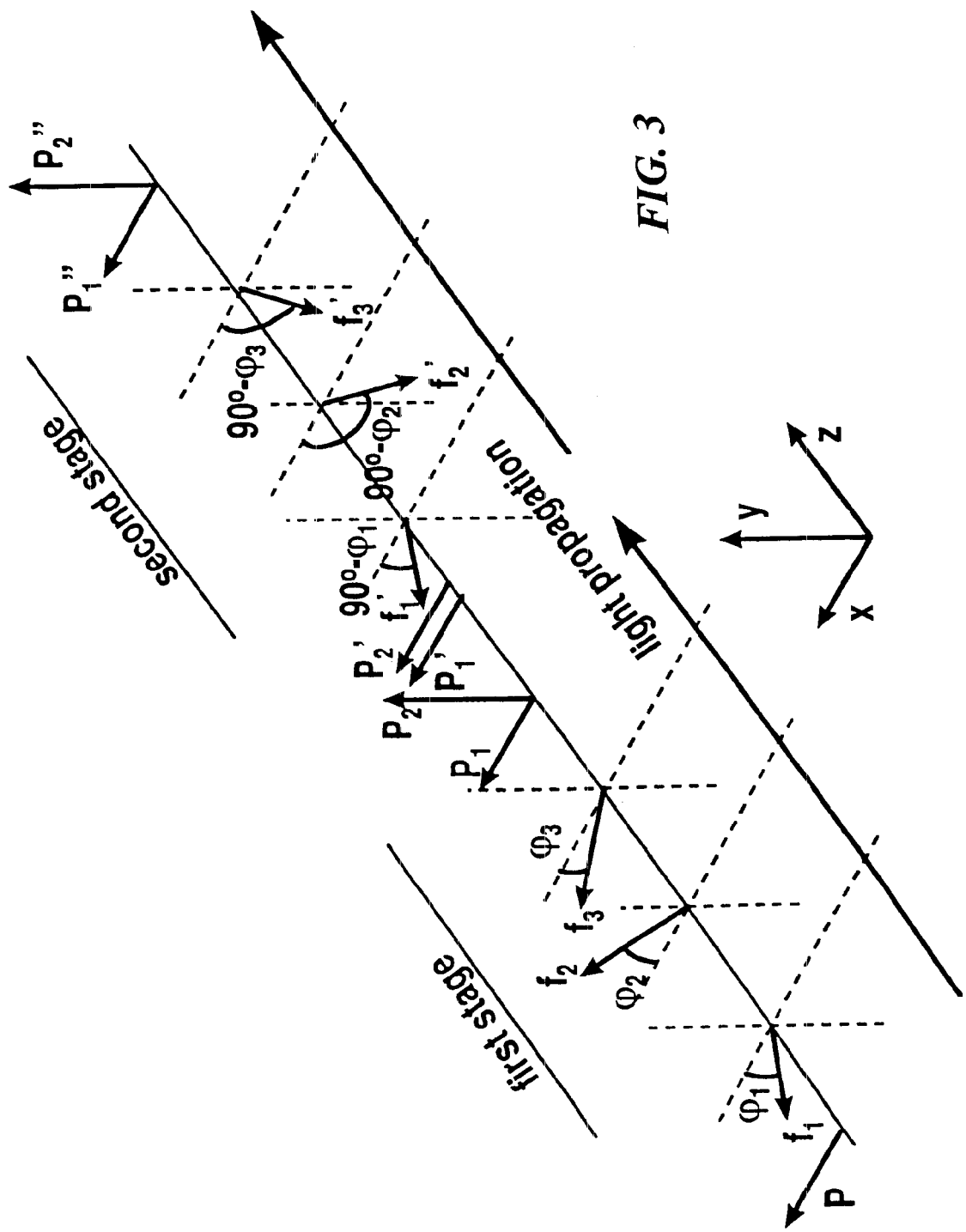
FIG. 3 is a schematic illustration of exemplary birefringent element orientations for the first stage (first interleaver element) and the second stage (second interleaver element) of an interleaver constructed according to an alternative configuration of the present invention, wherein the polarization direction of the first and second components entering the second stage are aligned with a polarization direction of a first one of the two components output from the first stage.
Figure 4:
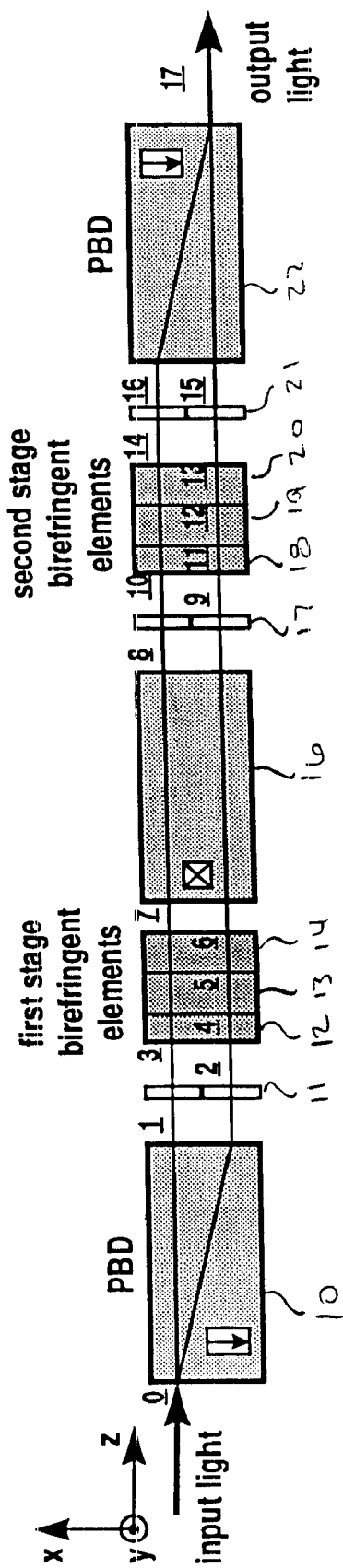
FIG. 4 is a schematic top view of an interleaver according to the present invention, wherein the first stage (first interleaver element) and the second stage (second interleaver element) thereof are disposed generally along a common axis and wherein the interleaver can operate, for example, according to either FIG. 2 or FIG. 3, depending upon the half-wave waveplate orientations thereof.
Figure 4:
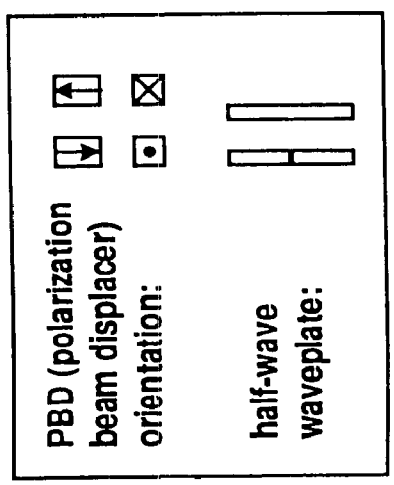

Various different orientations of the birefringent elements of the birefringent element assemblies may be utilized according to the present invention. Typically, a three-element birefringent element assembly is used although the birefringent element assembly can have more or less birefringent elements. For each set of birefringent element angular orientations of the first birefringent element assembly, there are two sets of suitable birefringent element angular orientations for the second birefringent element assembly. Thus, for birefringent element orientations of $\phi_1$, $\phi_2$, and $\phi_3$ with respect to the polarization direction of incoming light at the input of the first birefringent element assembly, both the angular orientations of $90°-\phi_1$, $90°-\phi_2$, $90°-\phi_3$ (these angles are referred to the incoming light polarization direction at the input of the second birefringent element assembly, e.g., $P_1'$, $P_2'$, at location 10 as shown in FIGS. 2–4) and the angular orientations of $90°+\phi_1$, $90°+\phi_2$, $90°+\phi_3$ (these angles are referred to the incoming light polarization direction at the input of the second birefringent element assembly) are suitable. Both such sets of angular orientations for the second birefringent element assembly provide the same transmission and dispersion characteristics for the interleaver element, and therefore are considered equivalent. Further, an equivalent to any angle can be obtained by adding +180° or −180° to that angle. One particular set of birefringent element angular orientations may be selected based upon manufacturing considerations.

The first and third birefringent elements of the birefringent element assembly may be swapped with one another. Swapping the first and third birefringent elements of the first and second birefringent element assemblies provides the same transmission and dispersion characteristics as in an interleaver element wherein the first and third birefringent elements are not swapped. Swapping of the first and third birefringent elements of the first birefringent element assembly and the second birefringent element assembly may be performed so as to facilitate manufacturability.

One example of orientation angles for the first birefringent element assembly is 45°, −21° and 7° with respect to the incoming light polarization direction (at the first-stage input) for the birefringent elements of the first birefringent element assembly. Birefringent elements having angular orientations of either 45°, −69° and 83° or 135°, 69° and 97° may then be utilized for the birefringent elements of the second birefringent element assembly, all with respect to the light polarization direction at the second stage input. In either instance, the phase delays for both the first and second birefringent element assemblies are $\Gamma$, $2\Gamma$ and $2\Gamma$. As discussed above, the first and third birefringent elements of the first and second birefringent element assemblies may be swapped, if desired.

According to one configuration of the present invention, the first birefringent element assembly and the second birefringent element assembly are disposed generally along the same axis with respect to one another. Thus, an in-line or linear interleaver is formed. Alternatively, the first and second birefringent element assemblies are not disposed generally along the same axis with respect to one another. Thus, the first and second birefringent element assemblies may be disposed side-by-side with respect to one another, orthogonally with respect to one another, or in any other desired orientation with respect to one another. When the first and second birefringent element assemblies are not disposed generally along the same axis with respect to one another, then a reflector, such as a prism or a plurality of mirrors, is preferably used to deflect light from the first birefringent element assembly to the second birefringent element assembly.

As those skilled in the art will appreciate, a Solc birefringent filter can be utilized in the construction of an interleaver in which several birefringent elements, typically birefringent crystals, are located between two polarizing devices, such as an input polarizer and an output polarizer. A typical layout of such a Solc birefringent filter utilizes birefringent crystals of lengths L, 2L, and 2L, which correspond to the relative phase delays $\Gamma$, $2\Gamma$, $2\Gamma$ provided thereby. Angular orientations for the three birefringent crystals of a Solc birefringent filter, according to contemporary practice, are 45°, −15° and 10°. As mentioned above, the low dispersion interleaver of the present invention may utilize any desired angular orientations of the birefringent elements thereof.

Referring now to FIG. 1, such a contemporary Solc birefringent filter typically comprises an input polarizer 11, an output polarizer 12 and a birefringent element assembly 13 disposed intermediate the input polarizer 11 and the output polarizer 12. The birefringent element assembly comprises a first birefringent crystal 15, second birefringent crystal 16 and third birefringent crystal 17.

Although the birefringent crystal orientations, e.g., 45°, −15° and 10°, utilized according to contemporary practice provide generally acceptable passband characteristics to a certain degree, it is possible that with careful design, a birefringent filter or interleaver can be designed having enhanced transmission characteristics. Such enhanced transmission characteristics may be provided by constructing the birefringent filter or interleaver so as to have birefringent elements disposed at desired angular orientations and having desired phase delays.

All contemporary birefringent filters and interleavers introduce a certain, undesirable amount of dispersion into a communication system. As discussed above, such dispersion undesirably inherently limits effective communication bandwidth or communication capacity. Communication capacity is limited by such dispersion by, for example, inhibiting further reductions in interleaver channel spacing.

As discussed above, for birefringent element orientations of $\phi_1$, $\phi_2$, and $\phi_3$ for the first, second, and third birefringent elements, respectively, the same transmission performance can be obtained at birefringent element orientations of $90°-\phi_1$, $90°-\phi_2$, and $90°-\phi_3$, as well at $90°+\phi_1$, $90°+\phi_2$, and $90°+\phi_3$, respectively. However, it is important to appreciate that the dispersion curves are flipped about the zero-dispersion axis for the two latter recited sets of orientation angles, when compared to the orientation angles of $\phi_1$, $\phi_2$, and $\phi_3$. Therefore, if light passes through two separate interleaver elements sequentially, wherein the two separate interleaver elements have been constructed such that they have flipped dispersion with respect to one another, then the dispersion of one interleaver element cancels the dispersion from the other interleaver element. In this manner, zero or nearly zero dispersion can be obtained. In the example discussed above, the odd channels and the even channels are polarized along the same direction before they are input into the second interleaver element (birefringent element assembly). Other examples are discussed in detail below, wherein the odd channels and the even channels are not polarized along the same directions before they are input into the second interleaver element. Thus, it is possible to obtain zero or extremely low dispersion for both the odd channels and the even channels by constructing an interleaver which comprises two birefringent filters or interleaver elements in tandem with one another.

It is also possible to utilize three separate interleaver elements to mitigate dispersion, by utilizing the first interleaver element to interleave channels into two sets thereof (odd and even channels), using a second interleaver element to compensate for the dispersion of the odd channels, and using a third interleaver element to compensate for the dispersion of the even channels. By way of contrast, the present invention accomplishes such mitigation of dispersion using only two interleaver elements.

Referring now to FIG. 2, one configuration of first and second stages or interleaver elements which achieves zero or nearly zero dispersion is shown schematically. P is the polarization direction for the input optical beam. The fast axes of the birefringent elements are represented by $f_1$, $f_2$, and $f_3$, respectively, in the first stage or interleaver element. Similarly, the fast axes of the birefringent elements are represented by $f_1'$, $f_2'$ and $f_3'$, respectively, in the second stage or interleaver element (birefringent element assembly).

The orientations of the birefringent elements in the first stage are represented by a set of angles, i.e., $\phi_1$, $\phi_2$, and $\phi_3$, which are all with respect to the input polarization direction P when looking at the incoming light. After the optical beam passes through the birefringent elements of the first stage or interleaver element, then two sets of interleaved signals having orthogonal polarizations with respect to one another are provided. For example, the odd channels are polarized along the direction $P_1$ and the even channels are polarized along the direction $P_2$, as shown.

Figure 7:
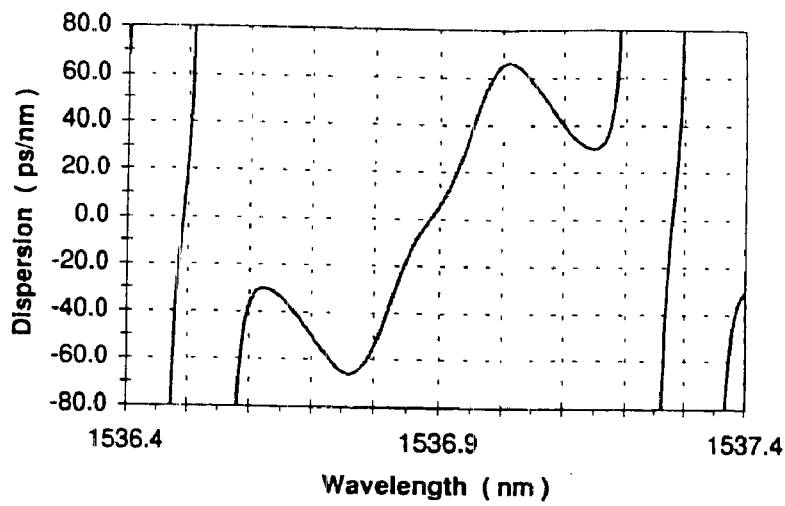
FIG. 7 is a chart showing dispersion versus wavelength for the interleaver (two stage interleaver having three elements in each stage thereof) of FIG. 4, after light has passed through only the first stage thereof, the first stage having birefringent element orientations of 45°, −21° and 7° and having phase delays of $\Gamma$, $2\Gamma$ and $2\Gamma$.
Figure 8:
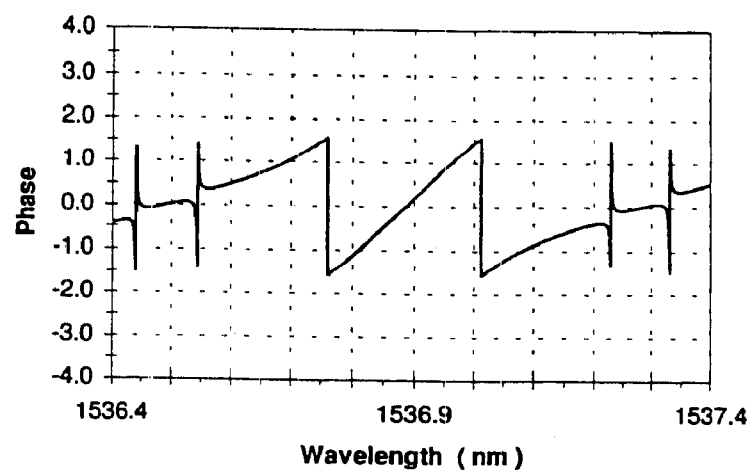
FIG. 8 is a chart showing phase versus wavelength for the interleaver (two stage interleaver having three elements in each stage thereof) of FIG. 4, after light has passed through only the first stage thereof, having birefringent element orientations of 45°, −21° and 7° and having phase delays of $\Gamma$, $2\Gamma$ and $2\Gamma$.
Figure 9:
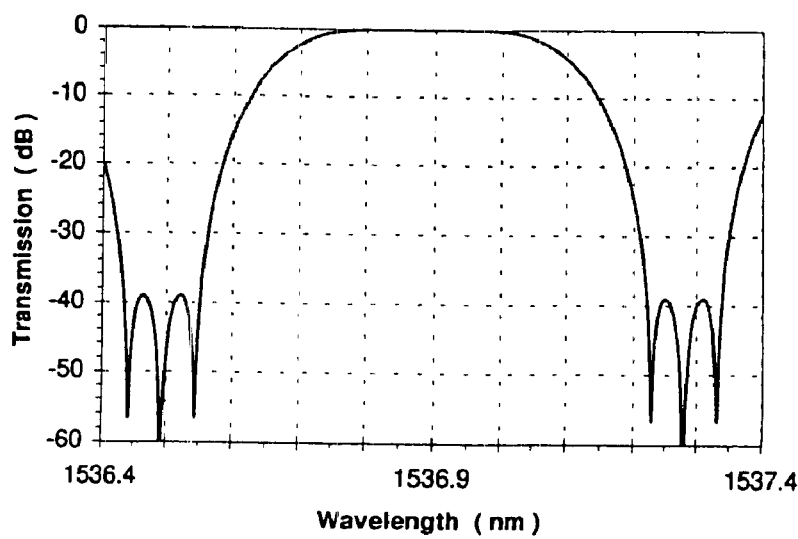
FIG. 9 is a chart showing transmission versus wavelength for the interleaver (two stage interleaver having three elements in each stage thereof) of FIG. 4, after light has passed through only the first stage thereof, having birefringent element orientations of 45°, −21° and 7° and having phase delays of $\Gamma$, $2\Gamma$ and $2\Gamma$.

Referring now to FIGS. 7, 8 and 9, the transmission characteristics for one channel of the first stage or interleaver element (birefringent element assembly) wherein $\phi_1=45°$, $\phi_2=-21°$, $\phi_3=7°$, $\Gamma_1=\Gamma$, $\Gamma_2=2\Gamma$ and $\Gamma_3=2\Gamma$ are shown. With particular reference it is clear that the dispersion of light having passed only through the first stage or interleaver element is nonzero, and is indeed substantial for wavelengths different from nominal channel center wavelength. In reality, the actual channel wavelength frequently deviates from the nominal channel center wavelength. FIGS. 8 and 9 show the phase distortion and transmission versus wavelength, respectively.

Referring again to FIG. 2, prior to the two optical beams $P_1'$ and $P_2'$, entering the second stage or interleaver element, the polarization directions thereof are positioned so as to be in the same direction, in order to compensate the dispersion of both even and odd channels simultaneously by the second stage or interleaver element. As shown in FIG. 2, the polarization direction of $P_1$ is rotated by 90° to $P_1'$, which is parallel to $P_2'$ (which is the same as $P_2$). The birefringent elements in the second stage are oriented so as to have birefringent element orientations of $90°-\phi_1$, $90°-\phi_2$, and $90°-\phi_3$ with respect to the input polarization direction $P_1'$ and $P_2'$. When both even channels and odd channels exit the second stage or interleaver element, then both the odd channels, which are polarized along $P_1''$ and the even channels, which are polarized along $P_2''$, have zero or nearly zero dispersion as long as the order of the birefringent elements of both interleaver elements or stages are the same. Other configuration are discussed below.

Referring now to FIG. 3, rather than rotating $P_1$ by 90° to $P_1'$, as shown in FIG. 2, it is alternatively possible to rotate $P_2$ by 90° to $P_2'$, which is parallel to $P_1'$ (which is the same as $P_1$). The birefringent elements in the second stage are oriented so as to have birefringent element orientation of $90°-\phi_1$, $90°-\phi_2$, and $90°-\phi_3$ with respect to the input polarization direction of $P_1'$ and $P_2'$. Thus when the even channels and odd channels of FIG. 3 exit the second stage or interleaver element, both the odd channels, which are polarized along the $P_1''$ and the even channels, which are polarized along the $P_2''$, have zero or nearly zero dispersion as long as the order of the birefringent elements of both interleaver elements or stages are the same. Other configuration are discussed below.

As shown in both FIGS. 2 and 3, the two light components output from the first stage birefringent element assembly are made to be parallel with respect to one another prior to entering the second stage birefringent element assembly. This is done so that both components are acted upon in the same fashion by the second stage. In this manner, the second stage introduces dispersion into both the first and second components which substantially cancels dispersion introduced thereto by the first stage. The order of the birefringent elements of each interleaver element or stage is the same.

Figure 10:
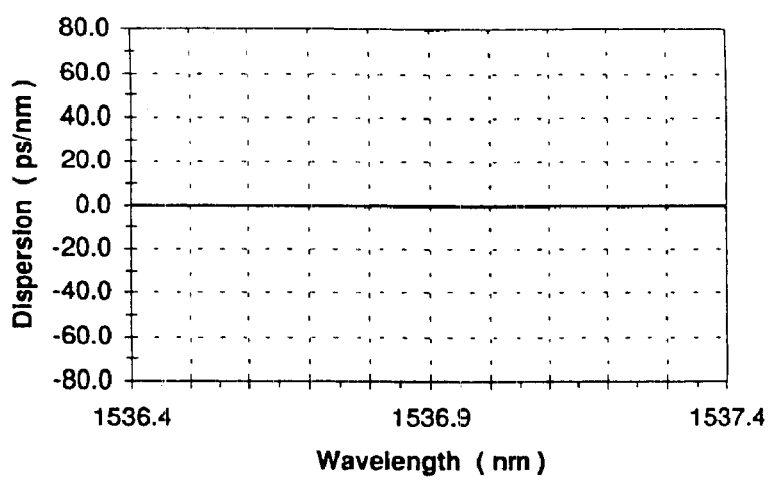
FIG. 10 is a chart showing dispersion versus wavelength for the interleaver (two stage interleaver having three elements in each stage thereof) of FIG. 4, after light has passed through both stages thereof, having first stage birefringent element orientations of 45°, −21° and 7° and having phase delays of $\Gamma$, $2\Gamma$ and $2\Gamma$.
Figure 11:
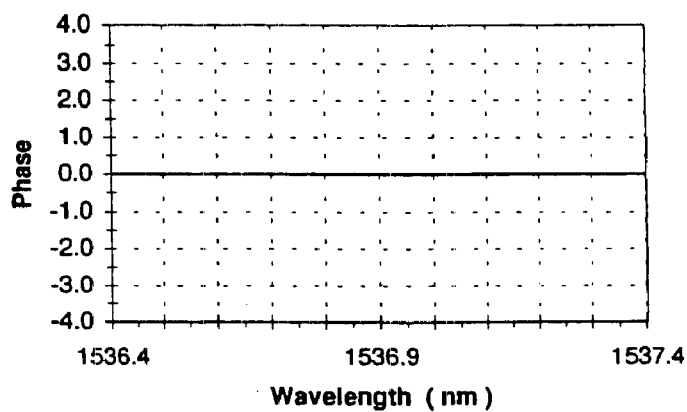
FIG. 11 is a chart showing phase versus wavelength for the interleaver (two stage interleaver having three elements in each stage thereof) of FIG. 4, after light has passed through both stages thereof, having first stage birefringent element orientations of 45°, −21° and 7° and having phase delays of $\Gamma$, $2\Gamma$ and $2\Gamma$.
Figure 12:
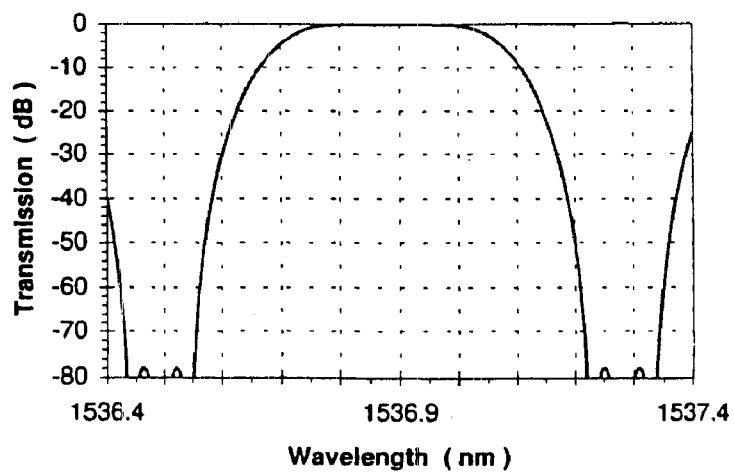
FIG. 12 is a chart showing transmission versus wavelength for the interleaver (two stage interleaver having three elements in each stage thereof) of FIG. 4, after light has passed through both stages thereof, having first stage birefringent element orientations of 45°, −21° and 70 and having phase delays of Γ, 2Γ and 2Γ.

Referring now to FIGS. 10–12, the transmission characteristics of light which was transmitted through both the first interleaver element or stage and the second interleaver element or stage, is shown. With particular reference to FIG. 10, it is clear that by transmitting light through two interleaver elements which are constructed according to the present invention (e.g., as shown in FIGS. 2–4) that zero or nearly zero dispersion is obtained. With particular reference to FIG. 11, zero phase distortion is similarly obtained. With particular reference to FIG. 12, the transmission characteristics include a generally flat passband and a comparatively deep and wide stopband. That is, for the stopband, the −30 dB bandwidth is comparatively wider than for a corresponding single stage interleaver (such as that shown in FIG. 9) and the crosstalk is almost −80 dB.

Referring now to FIG. 4, a low dispersion interleaver formed to have an in-line or linear configuration is shown. The linear low dispersion interleaver of the present invention comprises an input polarization beam displacer 10 which provides light to first input half-wave waveplates 11. After the light is transmitted through half-wave waveplates 11, the light is transmitted through a first stage or first birefringent element assembly, which at least partially defines a first birefringent filter or interleaver element. The first birefringent element assembly comprises a first birefringent element 12, a second birefringent element 13 and a third birefringent element 14. After being transmitted through the first birefringent element assembly, light is transmitted through an intermediate polarization beam displacer 16. Light from the intermediate polarization beam displacer 16 is transmitted through second input half-wave waveplates 17 and a second birefringent element assembly which at least partially defines a second birefringent filter or interleaver element. The second birefringent element assembly is comprised of a first birefringent element 18, a second birefringent element 19 and a third birefringent element 20.

Light from the second birefringent element assembly is transmitted through output half-wave waveplates 21 to the output polarization beam displacer 22.

A right-hand coordinate system of axes is used to characterize the optical beam propagation in the system at various locations with a convention that the light is propagating in the +z direction and the +y direction is out of the plane of the paper in FIG. 4.

Figure 5:
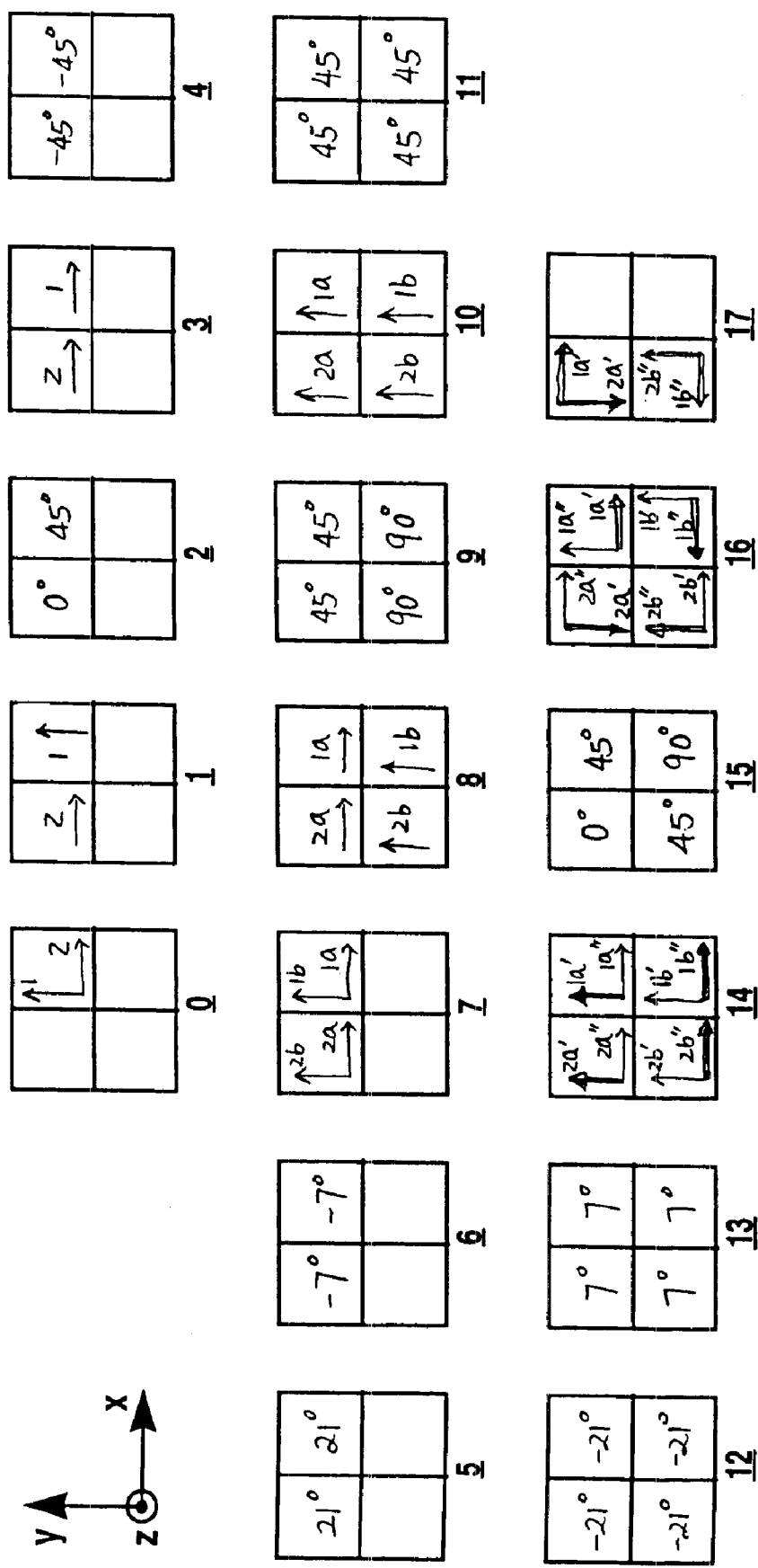
FIG. 5 is a series of schematic diagrams showing the optical beam states, crystal orientations and half-wave waveplate orientations at different locations for the interleaver of FIG. 4, wherein the polarizations of both components input to the second stage are aligned with the polarization of a second one of the two components exiting the first stage, as shown in FIG. 2.

Referring now to FIG. 5, the optical beam states, the crystal orientations and the optic axis orientations of the half-wave waveplates at various locations with respect to the +x axis at that location of the low dispersion interleaver of FIG. 4 are shown for an instance wherein FIG. 4 is configured as shown in FIG. 2 (with $P_1'$ and $P_2'$ both polarized in the same direction as $P_2$), wherein the order of the birefringent elements of each interleaver element or stage is the same.

Figure 6:
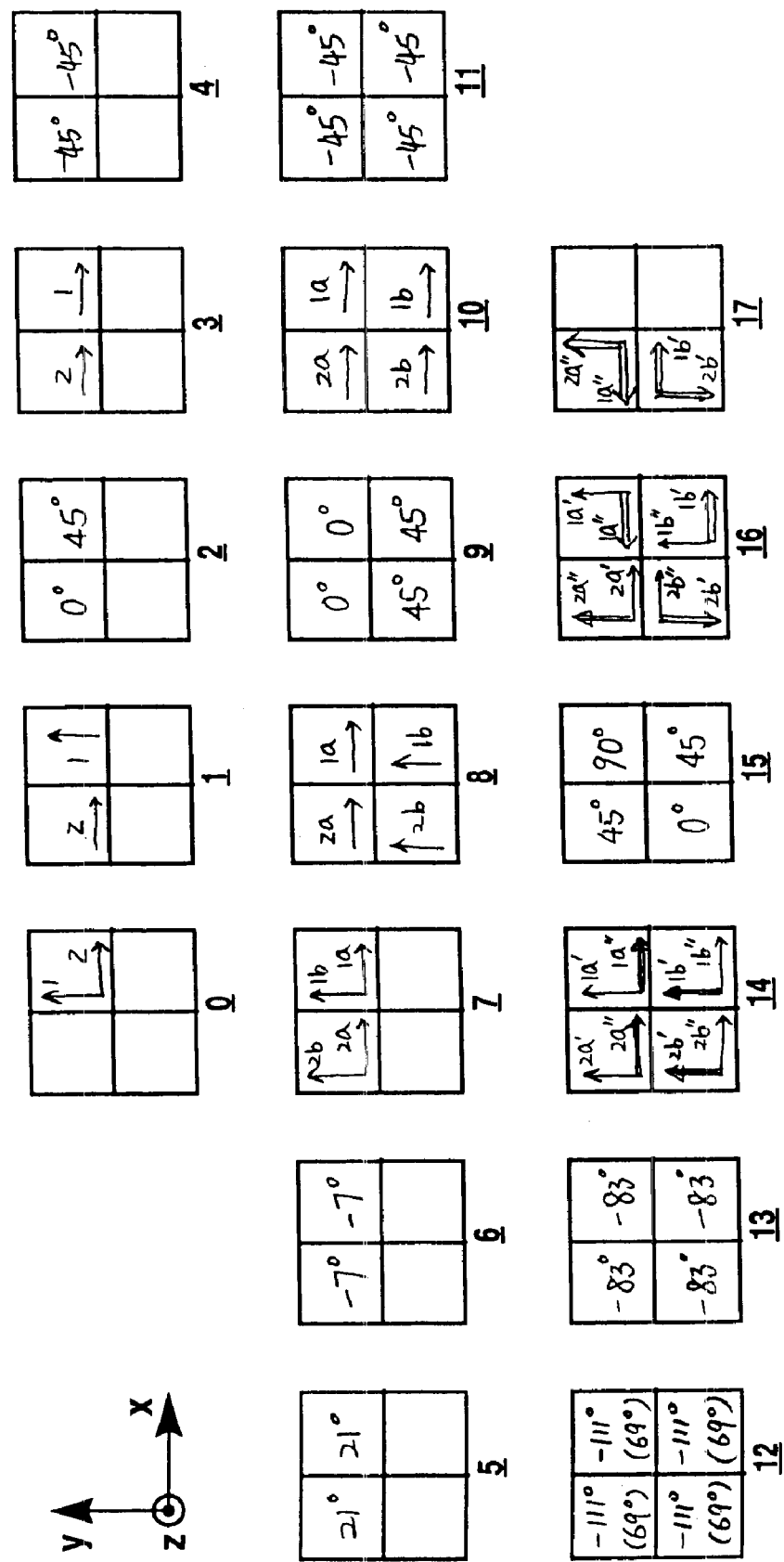
FIG. 6 is a series of schematic diagrams showing the optical beam states, crystal orientations and half-wave waveplate orientations at different locations for the interleaver of FIG. 4, wherein the polarizations of both components input to the second stage are aligned with the polarization of a first one of the two components exiting the first stage, as shown in FIG. 3.

Referring now to FIG. 6, the optical beam states, the crystal orientations and the half-wave waveplate orientations at various locations of the low dispersion interleaver of FIG. 4 are shown for an instance wherein FIG. 4 is configured as shown in FIG. 3 (with $P_2'$ and $P_1'$ both polarized in the same direction as $P_1$), wherein the order of the birefringent elements of each interleaver element or stage is the same.

In the frames of FIGS. 5 and 6, each of the four boxes corresponds to a physical beam position at various locations within the low dispersion interleaver of FIG. 4. The polarization beam displacers of FIG. 4 shift the optical beams between these beam positions according to the orientation of the polarization beam displacers and the optical beam polarizations.

With particular reference to FIG. 5, the first stage birefringent element orientations of 45°, −21° and 7°, and the phase delays of Γ, 2Γ and 2Γ are utilized to illustrate how an exemplary linear interleaver may be constructed. Those skilled in the art will appreciate that various other angle sets and birefringent phase delays are otherwise suitable.

At location 0, an input optical beam has two linearly polarized components: 1 (along the y direction) and 2 (along the x direction) at the top-right beam position. After the beam propagates through the input polarization beam displacer 10 to location 1, component 2 shifts to the top-left beam position and component 1 remains at the top-right beam position. The arrows shown on the polarization beam displacers indicate the beam shift direction thereof.

After components 1 and 2 pass through the two half-wave waveplates at location 2, the linearly polarized components 1 and 2 are polarized along the x axis at location 3. At location 2, the optic axis of the half-wave waveplate for component 1 is oriented at 45° with respect to the +x axis at that location and the optic axis of the half-wave waveplate for component 2 is oriented at 0° with respect to the +x axis at that location. At location 4, the first birefringent element is oriented with its fast axis at −45° with respect to the +x axis at that location. The orientations for the birefringent elements 2 and 3 are 21° and −7° with respect to the +x axis at locations 5 and 6, respectively. At location 7, the vertically polarized (y direction) components correspond to one set of the interleaved channels (e.g., the even channels) and the horizontally polarized (x-direction) components correspond to another set of interleaved channels (e.g., the odd channels). After they pass through the intermediate polarization beam displacer 16, the vertically polarized beams move to the bottom beam positions as shown at location 8.

After components pass through the half-wave waveplates (location 9), the polarization direction for all components is changed to or remain at the y direction at location 10. At location 9, the orientation of optic axes of the half-wave waveplates with respect to +x axis are shown in frame 9 in FIG. 5, as 45°, 45°, 90°, 90°, respectively. It is worthwhile to note that the polarization directions are all vertical at location 10. Thus, all of the beams are polarized in the same direction at this point. When these beams pass through the three birefringent elements in the second stage or interleaver element, where the birefringent element orientations are shown in FIG. 5 at locations 11, 12, and 13, with respect to the +x axis at that location, zero or nearly zero dispersion is obtained wherein the order of the birefringent elements of each interleaver element or stage is the same.

At location 14, the 1a' and the 2a' components are the corresponding odd channels and 1a" and 2a" are the crosstalk noise from the even channels (typically very small). The 1b" and the 2b" components are the corresponding even channels and 1b', 2b' are the crosstalk noise from the odd channel (typically very small). Using the half-wave waveplates at location 15 and an output polarization beam displacer, the two output beams 1a' and 2a' as well as 1b" and 2b" are combined at location 17, which corresponds to the two series of interleaved channels with zero or nearly zero dispersion, respectively. At location 15, the orientation of optic axes of the half-wave waveplates with respective to +x axis are shown in frame 15 in FIG. 5, as 0°, 45°, 45°, 90°, respectively.

Thick arrows (such as those of frames 14, 16, and 17) are used to indicate the desired (non-crosstalk) signal and thin arrows are used to indicate crosstalk when thick arrows are present.

Because the beam shift by the polarization beam displacers is symmetric in the apparatus, the polarization mode dispersion (PMD) is minimized.

It is important to appreciate that, although the birefringent element assemblies of the present invention described above comprise three birefringent elements, any desired number of birefringent elements may alternatively be utilized. For example, the use of four, five, or more birefringent elements tends to provide enhanced transmission characteristics with respect to the use of three birefringent elements. On the other hand, the low dispersion interleaver of the present invention may be constructed so as to have fewer than three birefringent elements in each interleaver element thereof, without adversely affecting the dispersion provided thereby.

Figure 13:
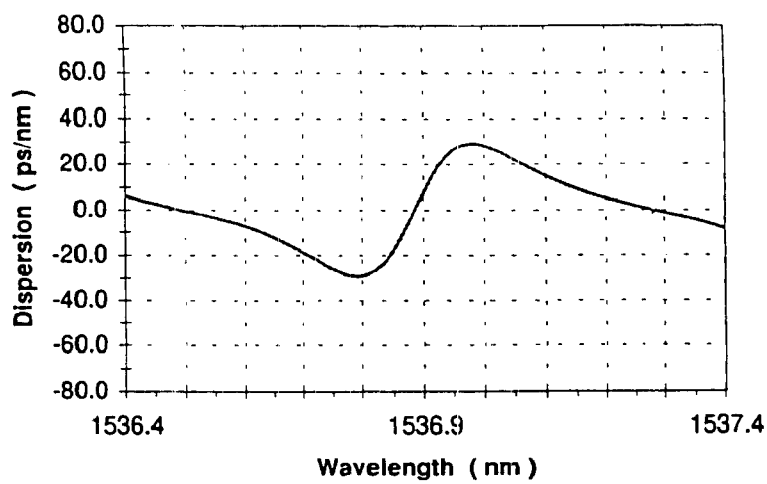
FIG. 13 is a chart showing dispersion versus wavelength for an interleaver (two stage interleaver having two elements in each stage thereof), after light has passed only through the first stage thereof, having birefringent element orientations of 45° and −15° and having phase delays of Γ and 2Γ.
Figure 14:
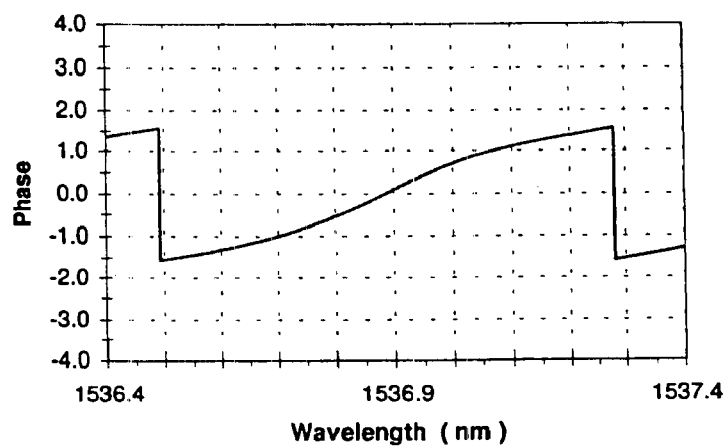
FIG. 14 is a chart showing phase versus wavelength for the interleaver (two stage interleaver having two elements in each stage thereof), after light has passed only through the first stage thereof, having birefringent element orientations of 45° and −15° and having phase delays of Γ and 2Γ.
Figure 15:
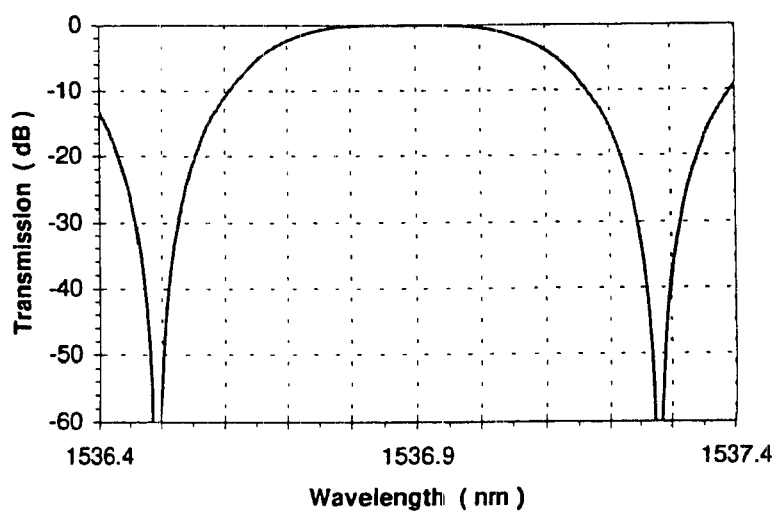
FIG. 15 is a chart showing transmission versus wavelength for the interleaver (two stage interleaver having two elements in each stage thereof), after light has passed only through the first stage thereof, having birefringent element orientations of 45° and −15° and having phase delays of Γ and 2Γ.

Referring now to FIGS. 13–15, the transmission characteristics of the first stage or interleaver element (birefringent element assembly) of a low dispersion interleaver constructed according to the present invention and having two birefringent elements wherein $\phi_1=45°$, $\phi_2=-15°$, $\Gamma_1=\Gamma$, $\Gamma_2=2\Gamma$ is shown. With particular reference to FIG. 13, it is clear that the output of the first stage of such a two-element birefringent element assembly has substantial dispersion when actual channel wavelength differs from the channel center wavelength.

Figure 16:
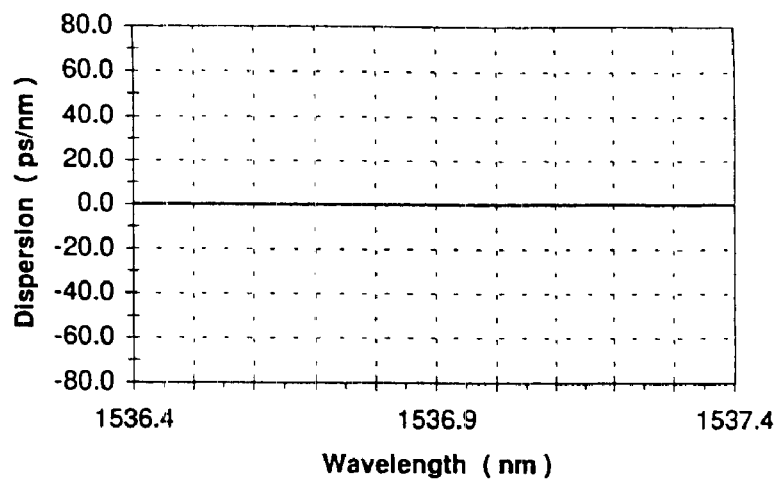
FIG. 16 is a chart showing dispersion versus wavelength for the interleaver (two stage interleaver having two elements in each stage thereof), after light has passed through both stages thereof, having first stage birefringent element orientations of 45° and −15° and having phase delays of Γ and 2Γ.
Figure 17:
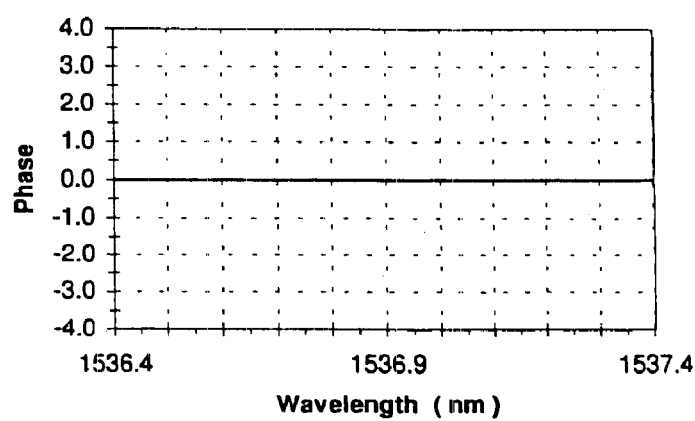
FIG. 17 is a chart showing phase versus wavelength for the interleaver (two stage interleaver having two elements in each stage thereof), after light has passed through both stages thereof, having first stage birefringent element orientations of 45° and −15° and having phase delays of Γ and 2Γ.
Figure 18:
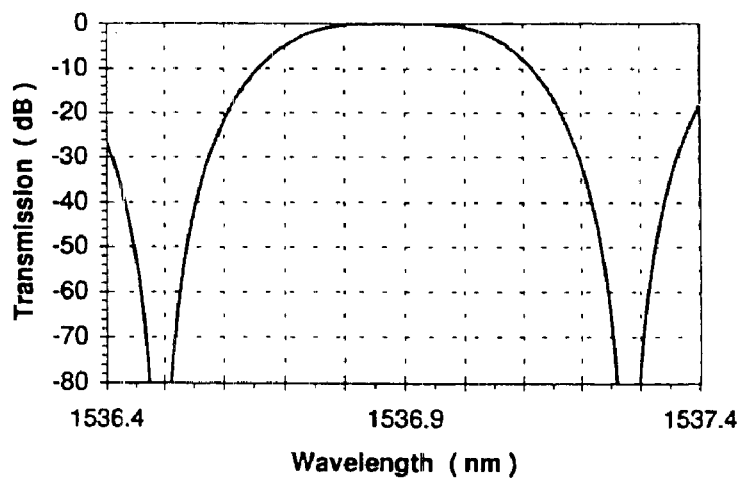
FIG. 18 is a chart showing transmission versus wavelength for the interleaver (two stage interleaver having two elements in each stage thereof), after light has passed only through both stages thereof, having first stage birefringent element orientations of 45°, and −15° and having phase delays of Γ and 2Γ.

Referring now to FIGS. 16–18, the output of the second stage or interleaver element of a two-birefringent-element low dispersion interleaver constructed according to the present invention has approximately zero dispersion.

The curves of FIGS. 13–18 are for a 50 GHz interleaver having birefringent element orientations for the first stage thereof of 45° and −15° with respect to input polarization direction at entry of the first stage and having phase delays for the first stage thereof of Γ and 2Γ. The half-wave waveplates orientations at location 2, 9, and 15 can be chosen as shown in FIG. 5 so that the output of the first stage can be aligned so as to be perpendicular to the input thereto as shown in FIG. 2. Or the half-wave waveplates orientations at locations 2, 9, and 15 can be chosen as shown in FIG. 6 so that the output of the first stage can be aligned so as to be parallel to the input thereto as shown in FIG. 3.

By eliminating the third (last) birefringent element in each birefringent element assembly in FIG. 4 and FIG. 5 or FIG. 6, a two-birefringent-element low dispersion interleaver can be obtained, wherein the birefringent elements orientations for the first stage are 45° and −21°, respectively.

A comparison of FIGS. 15 and 18 shows that the use of both stages provides enhanced stopband characteristics with respect to the use of only a single stage.

It is worthwhile to note that, if three birefringent elements are utilized according to the present invention, for each of the two stages thereof, the birefringent elements in positions 1 and 3 for each stage are exchangeable. That is, a similar exchange may be made simultaneously in both stages without changing the transmission or dispersion characteristic of the device. Such exchangeability provides enhanced flexibility and ease in device assembly.

In the examples provided above, the dispersion compensation angles for the second stage are selected as $90°-\phi_1$, $90°-\phi_2$, and $90°-\phi_3$ with respect to the angles of the first stage of $\phi_1$, $\phi_2$, and $\phi_3$. However, similar dispersion performance is obtained when angles of $90°+\phi_1$, $90°+\phi_2$, and $90°+\phi_3$ are utilized in the second stage.

Referring now to FIG. 19, an exemplary low dispersion interleaver wherein the first birefringent element assembly and the second birefringent element assembly thereof are not collinear with respect to one another is shown. A prism 15 deflects light from the first birefringent element assembly to the second birefringent element assembly. Those skilled in the art will appreciate that various other devices, such as mirrors, may be similarly utilized to deflect light from the first birefringent element assembly to the second birefringent element assembly. Further, the first birefringent element assembly and the second birefringent element assembly may be at any desired angle with respect to one another and need not be either collinear (as shown in FIG. 4) or parallel (as shown in FIG. 19).

Figure 20:
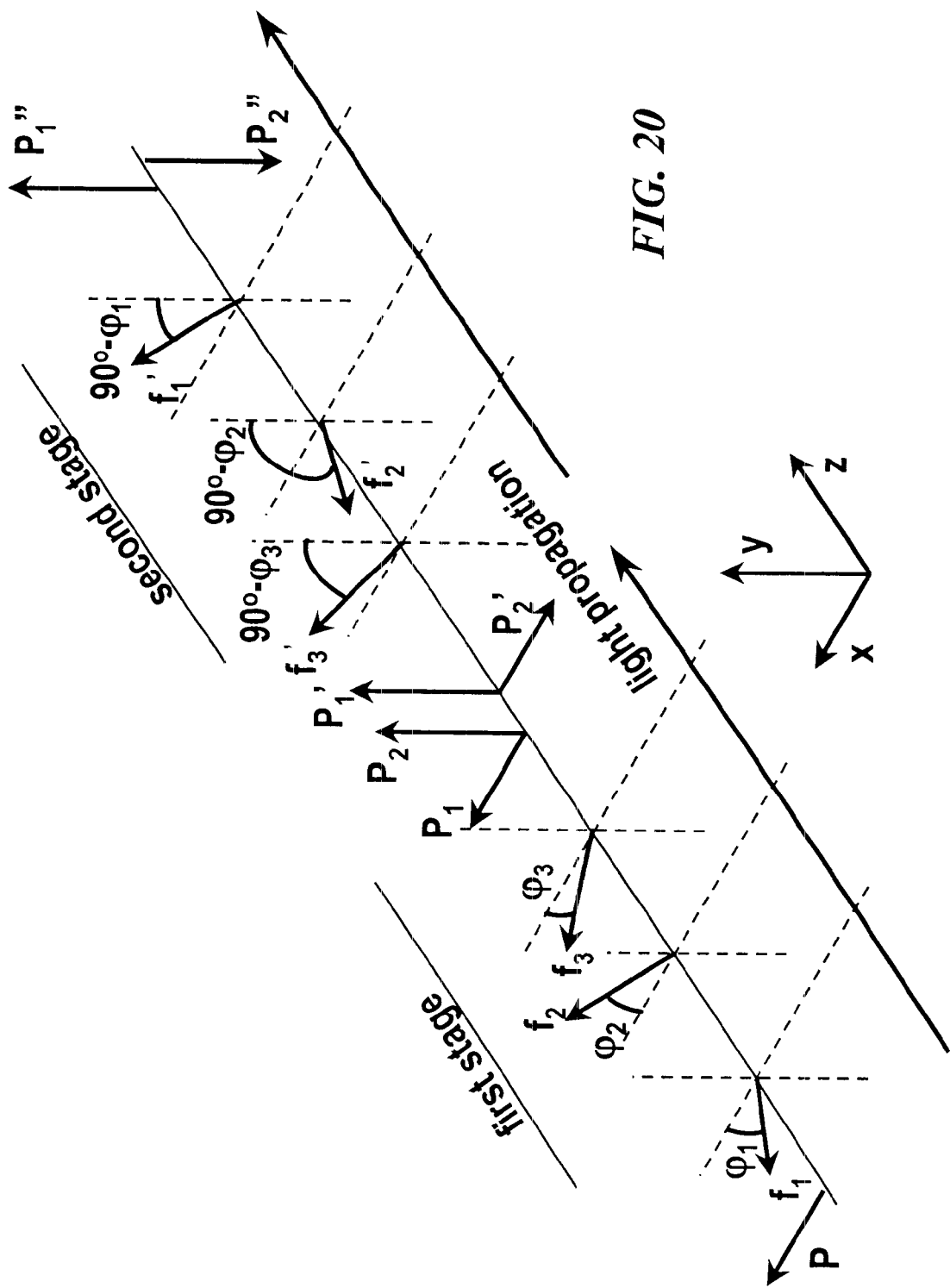
FIG. 20 is a schematic illustration of exemplary birefringent element orientations for the first stage (first interleaver element) and the second stage (second interleaver element) of an interleaver constructed according to another alternative configuration of the present invention, wherein the polarization directions of the first and second components entering the second stage are each rotated by 90° such that the first component entering the second stage is aligned with the second component output from the first stage.

FIG. 20 is a schematic illustration of exemplary birefringent element orientations for the first stage (first interleaver element) and the second stage (second interleaver element) of an interleaver constructed according to one embodiment of the present invention, wherein the polarization direction of the first and second components are rotated by 90° prior to enter second stage.

Figure 21:
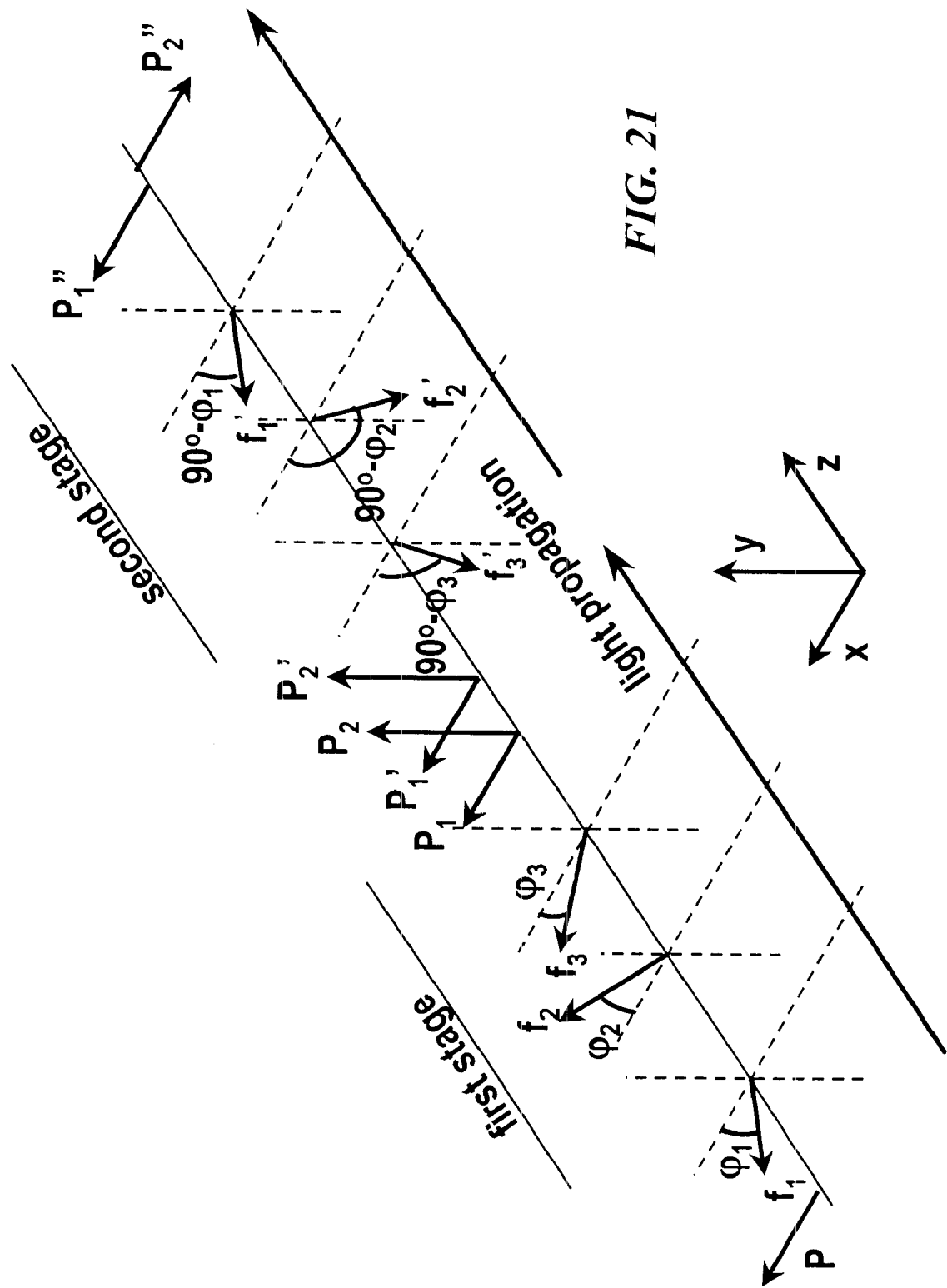
FIG. 21 is a schematic illustration of exemplary birefringent element orientations for the first stage (first interleaver element) and the second stage (second interleaver element) of an interleaver constructed according to another alternative configuration of the present invention, wherein the polarization directions of the first and second components entering the second stage are aligned with the polarization directions of the first and second output components from the first stage (the polarization direction of the first component entering the second stage is aligned with the polarization direction of first component output from the first stage and the polarization direction of the second component entering the second stage is aligned with the polarization direction of the second output from the first stage)

FIG. 21 is a schematic illustration of exemplary birefringent element orientations for the first stage (first interleaver element) and the second stage (second interleaver element) of an interleaver constructed according to an alternative configuration of the present invention, wherein the polarization direction of the first and second components entering the second stage remain unchanged.

Figure 22:
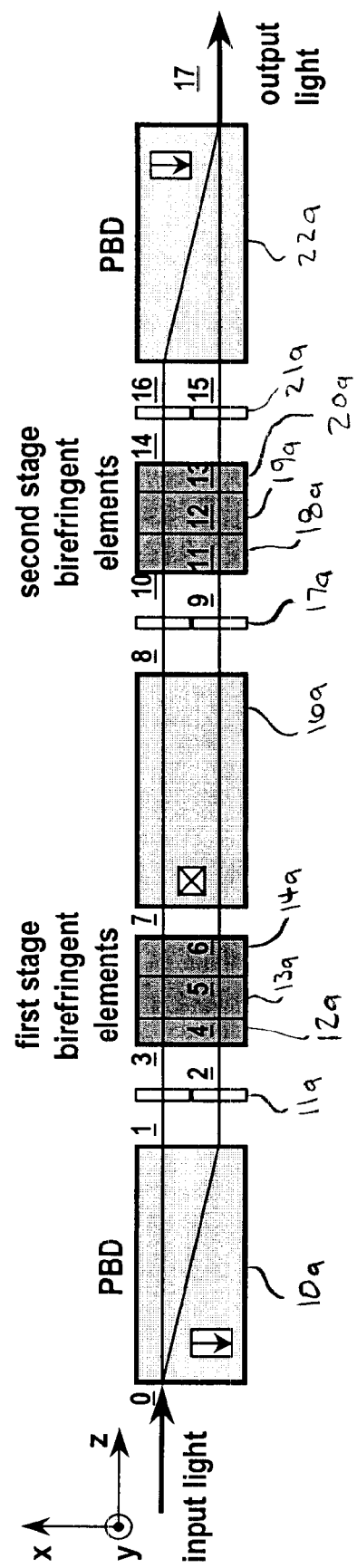
FIG. 22 is a schematic top view of an interleaver according to the present invention, wherein the first stage (the first interleaver element) and the second stage (the second interleaver element) thereof are disposed generally along a common axis and wherein the interleaver can operate, for example, according to either FIG. 20 or FIG. 21, depending upon the half-wave waveplate orientations thereof.
Figure 22:
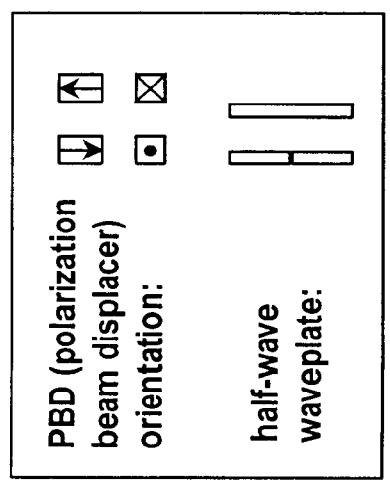

FIG. 22 is a schematic top view of an interleaver according to the present invention, wherein the first stage (first interleaver element) and the second stage (second interleaver element) thereof are disposed generally along a common axis and wherein the interleaver can operate, for example, according to either FIG. 20 or FIG. 21, depending upon the half-wave waveplate orientations thereof.

Figure 23:
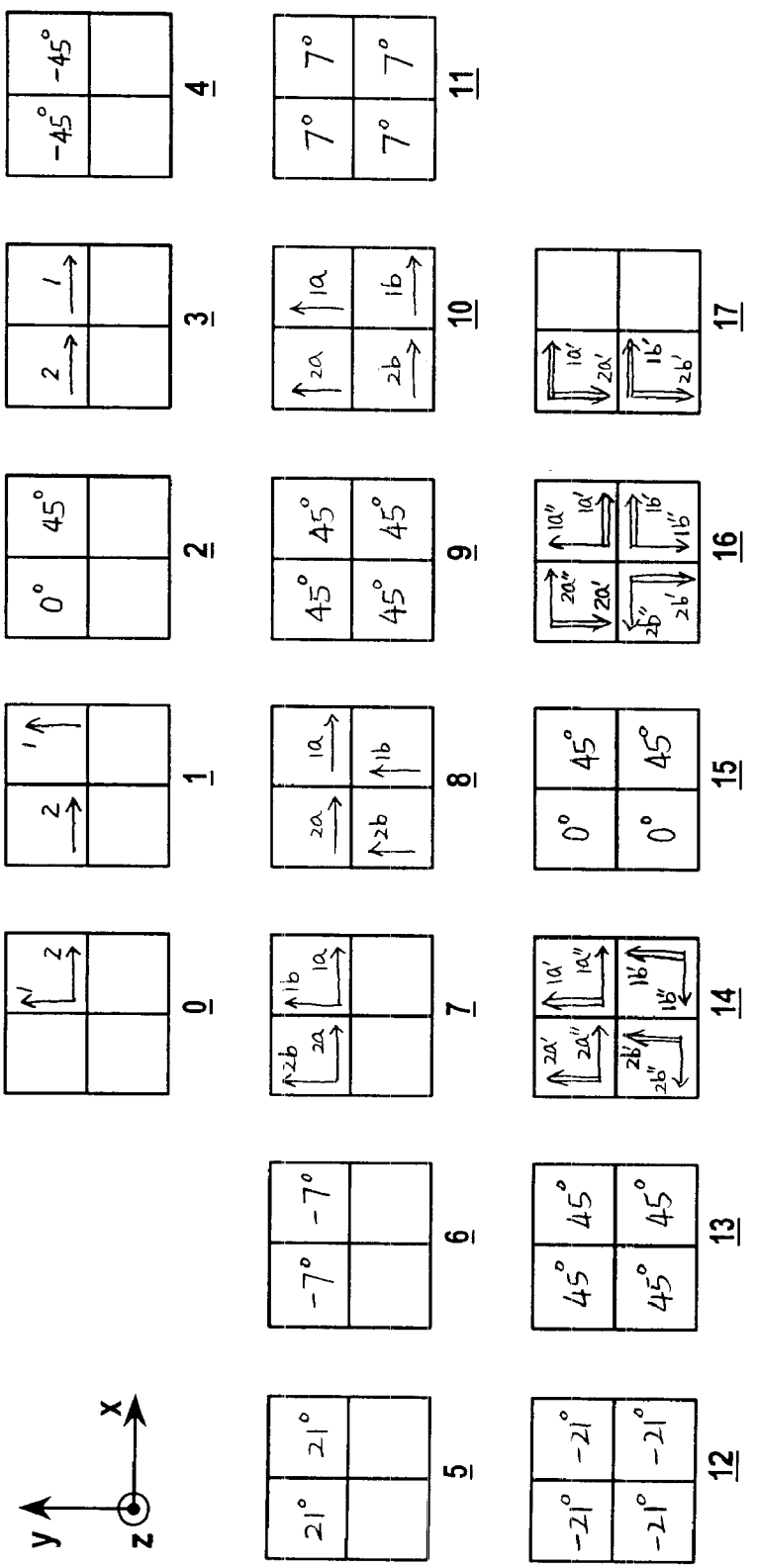
FIG. 23 is a series of schematic diagrams showing the optical beam states, crystal orientations and half-wave waveplate orientations at different locations for the interleaver of FIG. 22, wherein the polarizations of both components input to the second stage are oriented at 90° with respect to the polarizations of the two components exiting the first stage, as shown in FIG. 20.

FIG. 23 is a series of schematic diagrams showing the optical beam states, crystal orientations and half-wave waveplate orientations at different locations for the interleaver of FIG. 22, wherein the polarizations of both components input to the second stage are rotated by 90°, as shown in FIG. 20.

Figure 24:
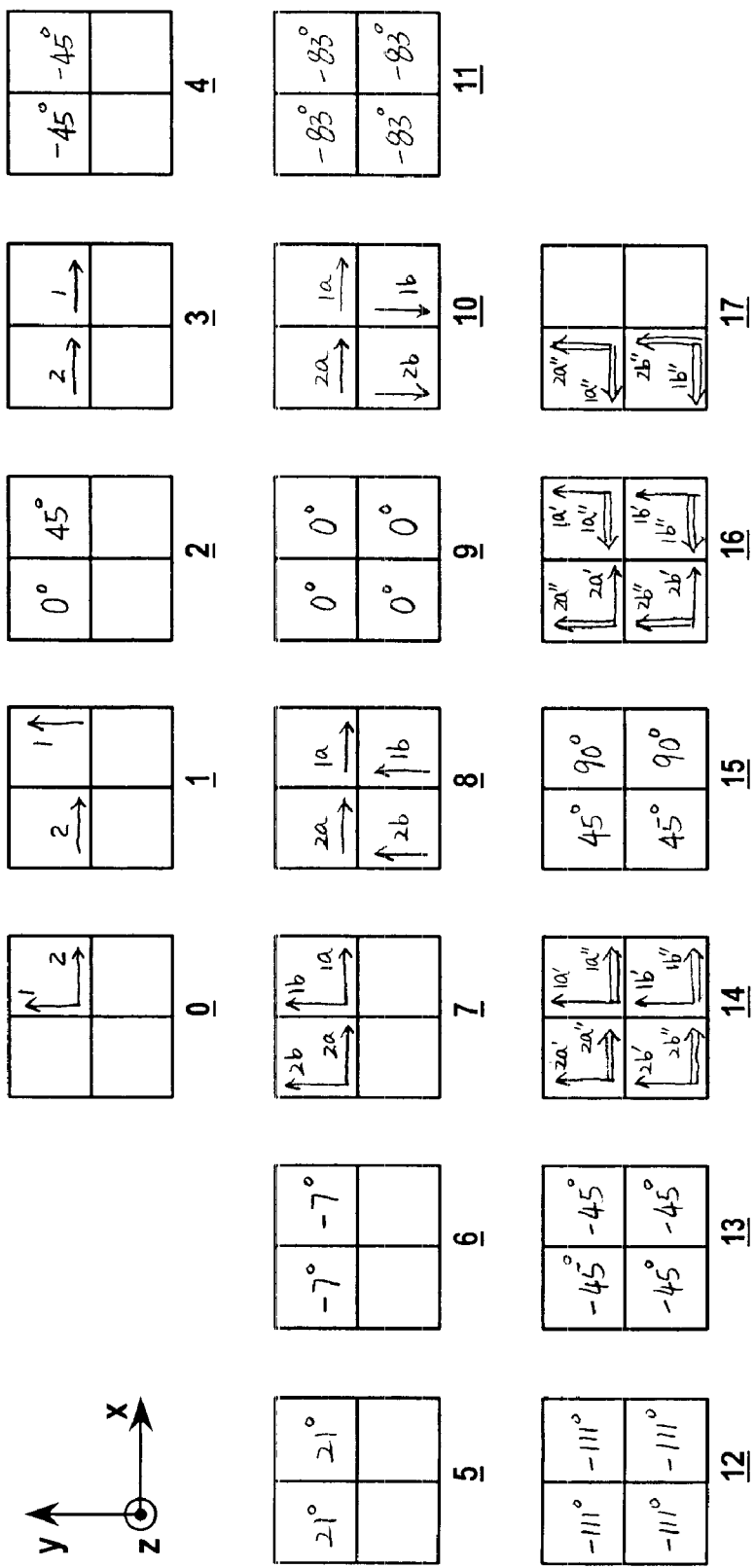
FIG. 24 is a series of schematic diagrams showing the optical beam states, crystal orientations and half-wave waveplate orientations at different locations for the interleaver of FIG. 22, wherein the polarizations of both components input to the second stage are aligned with the polarizations of the first and second components exiting the first stage, as shown in FIG. 21.

FIG. 24 is a series of schematic diagrams showing the optical beam states, crystal orientations and half-wave waveplate orientations at different locations for the interleaver of FIG. 22, wherein the polarizations of both components input to the second stage remain unchanged as shown in FIG. 21.

Referring now to FIG. 20, one configuration of first and second stages or interleaver elements which achieves zero or nearly zero dispersion is shown schematically. P is the polarization direction for the input optical beam. The fast axes of the birefringent elements are represented by $f_1$, $f_2$, and $f_3$, respectively, in the first stage or interleaver element. Correspondently, the fast axes of the birefringent elements are represented by $f_3'$, $f_2'$ and $f_1'$, respectively, in the second stage or interleaver element (birefringent element assembly).

The orientations of the birefringent elements in the first stage are represented by a set of angles, i.e., $\phi_1$, $\phi_2$, and $\phi_3$, which are all with respect to the input polarization direction P when looking at the incoming light. After the optical beam passes through the birefringent elements of the first stage or interleaver element, then two sets of interleaved signals having orthogonal polarizations with respect to one another are provided. For example, the odd channels are polarized along the direction $P_1$ and the even channels are polarized along the direction $P_2$, as shown.

Referring again to FIG. 20, prior to the two optical beams $P_1'$ and $P_2'$, entering the second stage or interleaver element, the polarization directions thereof are positioned so as to be rotated by 90°, in order to compensate the dispersion of both even and odd channels simultaneously by the second stage or interleaver element. As shown in FIG. 20, the polarization direction of $P_1$ is rotated by 90° to $P_1'$, and $P_2$ is rotated by 90° to $P_2'$. The birefringent elements in the second stage are oriented so as to have birefringent element orientations of $90°-\phi_3$, $90°-\phi_2$, and $90°-\phi_1$ with respect to the input polarization direction $P_1'$ and $-\phi_3$, $-\phi_2$, and $-\phi_1$, with respect to input polarization direction $P_2'$. When both even channels and odd channels exit the second stage or interleaver element, then both the odd channels, which are polarized along $P_1''$ and the even channels, which are polarized along $P_2''$, have zero or nearly zero dispersion.

Referring now to FIG. 21, rather than rotating $P_1$ and $P_2$ by 90°, as shown in FIG. 20, it is alternatively possible to have remain $P_1$ and $P_2$ unchanged. The birefringent elements in the second stage are oriented so as to have birefringent element orientation of $90°-\phi_3$, $90°-\phi_2$, and $90°-\phi_1$ with respect to the input polarization direction of $P_1'$ and $-\phi_3$, $-\phi_2$, and $-\phi_1$, with respect to input polarization direction $P_2'$. Thus when the even channels and odd channels of FIG. 21 exit the second stage or interleaver element, both the odd channels, which are polarized along the $P_1''$ and the even channels, which are polarized along the $P_2''$, have zero or nearly zero dispersion.

As shown in both FIGS. 20 and 21, the two light components output from the first stage birefringent element assembly are kept to be orthogonal with respect to one another prior to entering the second stage birefringent element assembly. This is done so that both components are acted upon in the reverse order fashion by the second stage. In this manner, the second stage introduces dispersion into both components which substantially cancels dispersion introduced thereto by the first stage.

Referring now to FIG. 22, a low dispersion interleaver formed to have an in-line or linear configuration is shown.

The linear low dispersion interleaver of the present invention comprises an input polarization beam displacer 10a which provides light to first input half-wave waveplates 11a. After the light is transmitted through half-wave waveplates 11a, the light is transmitted through a first stage or first birefringent element assembly, which at least partially defines a first birefringent filter or interleaver element. The first birefringent element assembly comprises a first birefringent element 12a, a second birefringent element 13a and a third birefringent element 14a. After being transmitted through the first birefringent element assembly, light is transmitted through an intermediate polarization beam displacer 16a. Light from the intermediate polarization beam displacer 16a is transmitted through second input half-wave waveplates 17a and a second birefringent element assembly which at least partially defines a second birefringent filter or interleaver element. The second birefringent element assembly is comprised of a first birefringent element 18a, a second birefringent element 19a and a third birefringent element 20a. Light from the second birefringent element assembly is transmitted through output half-wave waveplates 21a to the output polarization beam displacer 22a.

A right-hand coordinate system of axes is used to characterize the optical beam propagation in the system at various locations with a convention that the light is propagating in the +z direction and the +y direction is out of the plane of the paper in FIG. 22.

Referring now to FIG. 23, the optical beam states, the crystal orientations and the optic axis orientations of the half-wave waveplates at various locations with respect to the +x axis at that location of the low dispersion interleaver of FIG. 22 are shown for an instance wherein FIG. 22 is configured as shown in FIG. 20.

Referring now to FIG. 24, the optical beam states, the crystal orientations and the half-wave waveplate orientations at various locations of the low dispersion interleaver of FIG. 22 are shown for an instance wherein FIG. 22 is configured as shown in FIG. 21.

In the frames of FIGS. 23 and 24, each of the four boxes corresponds to a physical beam position at various locations within the low dispersion interleaver of FIG. 22. The polarization beam displacers of FIG. 22 shift the optical beams between these beam positions according to the orientation of the polarization beam displacers and the optical beam polarizations.

With particular reference to FIG. 23, the first stage birefringent element orientations of 45°, −21° and 7°, and the phase delays of Γ, 2Γ and 2Γ are utilized to illustrate how an exemplary linear interleaver may be constructed. Those skilled in the art will appreciate that various other angle sets and birefringent phase delays are otherwise suitable.

At location 0, an input optical beam has two linearly polarized components: 1 (along the y direction) and 2 (along the x direction) at the top-right beam position. After the beam propagates through the input polarization beam displacer 10a to location 1, component 2 shifts to the top-left beam position and component 1 remains at the top-right beam position. The arrows shown on the polarization beam displacers indicate the beam shift direction thereof.

After components 1 and 2 pass through the two half-wave waveplates at location 2, the linearly polarized components 1 and 2 are polarized along the x axis at location 3. At location 2, the optic axis of the half-wave waveplate for component 1 is oriented at 45° with respect to the +x axis at that location and the optic axis of the half-wave waveplate for component 2 is oriented at 0° with respect to the +x axis at that location. At location 4, the first birefringent element is oriented with its fast axis at −45° with respect to the +x axis at that location. The orientations for the birefringent elements 2 and 3 are 21° and −7° with respect to the +x axis at locations 5 and 6, respectively. At location 7, the vertically polarized (y direction) components correspond to one set of the interleaved channels (e.g., the even channels) and the horizontally polarized (x-direction) components correspond to another set of interleaved channels (e.g., the odd channels). After they pass through the intermediate polarization beam displacer 16a, the vertically polarized beams move to the bottom beam positions as shown at location 8.

After components pass through the half-wave waveplates (location 9), the polarization direction for all components is rotated by 90°. At location 9, the orientation of optic axes of the half-wave waveplates with respect to +x axis are shown in frame 9 in FIG. 23, as 45°, 45°, 45°, 45°, respectively. When these beams pass through the three birefringent elements in the second stage or interleaver element, where the birefringent element orientations are shown in FIG. 23 at locations 11, 12, and 13, with respect to the +x axis at that location, zero or nearly zero dispersion is obtained, according to the present invention.

At location 14, the 1a' and the 2a' components are the corresponding odd channels and 1a" and 2a" are the crosstalk noise from the even channels (typically very small). The 1b' and the 2b' components are the corresponding even channels and 1b", 2b" are the crosstalk noise from the odd channel (typically very small). Using the half-wave waveplates at location 15 and an output polarization beam displacer, the two output beams 1a' and 2a' as well as 1b' and 2b' are combined at location 17, which corresponds to the two series of interleaved channels with zero or nearly zero dispersion, respectively. At location 15, the orientation of optic axes of the half-wave waveplates with respective to +x axis are shown in frame 15 in FIG. 23, as 0°, 45°, 0°, 45°, respectively.

Thick arrows (such as those of frames 14, 16, and 17) are used to indicate the desired (non-crosstalk) signal and thin arrows are used to indicate crosstalk when thick arrows are present.

Referring now to FIG. 24, the optical beam states, the crystal orientations and the half-wave waveplate orientations at various locations of the low dispersion interleaver of FIG. 22 are shown an instance wherein FIG. 22 is configured as shown in FIG. 21.

As shown in FIG. 24, the optical beam states, crystal orientations and half-wave waveplates orientations are similar to those of FIG. 23, with the notable exception that the half-wave waveplate orientations at location 9 are all 0° so as to cause the polarization directions of the components input to the second stage to be the same as the polarization directions of the if components output from the first stage. The 0° orientations of the half-wave waveplates at location 1 indicate that they actually can be eliminated in current configuration.

Also, the orientations of the waveplates at location 15 are different from those of FIG. 23 since the polarization directions of the second stage in FIG. 24 are different than they are in FIG. 23, thereby requiring different half-wave waveplate orientations so as to define the desire odd and even channel outputs from the interleaver assembly.

Because the beam shift by the polarization beam displacers is symmetric in the apparatus, the polarization mode dispersion (PMD) is minimized.

It is important to appreciate that, although the birefringent element assemblies of the present invention described above comprise three birefringent elements, any desired number of birefringent elements may alternatively be utilized. For example, the use of four, five, or more birefringent elements tends to provide enhanced transmission characteristics with respect to the use of three birefringent elements. On the other hand, the low dispersion interleaver of the present invention may be constructed so as to have fewer than three birefringent elements in each interleaver element thereof, without adversely affecting the dispersion provided thereby.

here are four basic configurations where one set of birefringent elements can be made to substantially cancel the dispersion introduced by another set of birefringent elements and wherein each set of birefringent elements has phase delays of either $\Gamma$, $2\Gamma$, and $2\Gamma$ or $2\Gamma$, $2\Gamma$ and $\Gamma$. The first configuration is where the first set of birefringent elements has phase delays of $\Gamma$, $2\Gamma$ and $2\Gamma$ and the second set of birefringent elements likewise has phase delays of $\Gamma$, $2\Gamma$ and $2\Gamma$. The second configuration is where the first set of birefringent elements has phase delays of $2\Gamma$, $2\Gamma$ and $\Gamma$ and the second set of birefringent elements has phase delays of $2\Gamma$, $2\Gamma$ and $\Gamma$. The third configuration is where the first set of birefringent elements has phase delays of $\Gamma$, $2\Gamma$ and $2\Gamma$ and the second set of birefringent elements has phase delays of $2\Gamma$, $2\Gamma$ and $\Gamma$ (the order of the phase delays of second set of birefringent elements is reversed with respect to the order of the phase delays of the first set of birefringent elements). The fourth configuration is where the first set of birefringent elements has phase delays of $2\Gamma$, $2\Gamma$ and r and the second set of birefringent elements has phase delays of $\Gamma$, $2\Gamma$ and $2\Gamma$ (the order of the phase delays of second set of birefringent elements is reversed with respect to the order of the phase delays of the first set of birefringent elements).

For each of these four configurations, birefringent element orientations can be selected so as to provide enhanced transmission characteristics and substantially zero dispersion values. That is, for each first set of birefringent element orientations ($\phi_1$, $\phi_2$, and $\phi_3$ or $\phi_3$, $\phi_2$, and $\phi_1$), there is at least one second set of birefringent elements which provide enhanced transmission characteristics while also providing zero or approximately zero dispersion.

For the first configuration (wherein the first set of birefringent elements has phase delays of $\Gamma$, $2\Gamma$, and $2\Gamma$ and the second set of birefringent elements likewise has phase delays of $\Gamma$, $2\Gamma$, and $2\Gamma$) birefringent element orientations of $\phi_1$, $\phi_2$, and $\phi_3$ (with respect to the input polarization direction of light input to the first set of birefringent elements) for the first set of birefringent elements and birefringent element orientations of either $90°-\phi_1$, $90°-\phi_2$, and $90°-\phi_3$ or $90°+\phi_1$, $90°+\phi_2$, and $90°+\phi_3$ (with respect to the input polarization direction of light to the second set of birefringent elements) for the second set of birefringent elements will provide enhanced transmission characteristics and substantially zero dispersion. In this instance, both the component output from the first set of birefringent elements which is parallel to the input thereto and the component output which is orthogonal to the input thereto are transmitted through a second set of birefringent elements having one set of the orientations $90°-\phi_1$, $90°-\phi_2$, and $90°-\phi_3$ or $90°+\phi_1$, $90°+\phi_2$, and $90°+\phi_3$ (with respect to the input light input to the second set of birefringent elements).

For the second configuration (wherein the first set of birefringent elements has phase delays of $2\Gamma$, $2\Gamma$ and $\Gamma$ and the second set of birefringent elements likewise has phase delays of $2\Gamma$, $2\Gamma$ and $\Gamma$) birefringent element orientations of $\phi_3$, $\phi_2$, and $\phi_1$ (with respect to the input polarization direction of light input to the first set of birefringent elements) for the first set of birefringent elements and birefringent element orientations of either $90°-\phi_3$, $90°-\phi_2$, and $90°-\phi_1$ or $90°+\phi_3$, $90°+\phi_2$, and $90°+\phi_1$ (with respect to the input polarization direction of light input to the second set of birefringent elements) will provide enhanced transmission characteristics and substantially zero dispersion. In this instance, both the component output from the first set of birefringent elements which is parallel to the input thereto and the component output which is orthogonal to the input thereto are transmitted through a second set of birefringent elements having one set of the orientations $90°-\phi_3$, $90°-\phi_2$, $90°\phi_1$ or $90°+\phi_3$, $90°+\phi_2$, and $90°+\phi_1$ (with respect to the input polarization direction of light input to the second set of birefringent elements).

For the third configuration, wherein the first set of birefringent elements has phase delays of $\Gamma$, $2\Gamma$, and $2\Gamma$, and the second set of birefringent elements has phase delays of $2\Gamma$, $2\Gamma$, and r, the output component of the first set of birefringent elements which is parallel to the input thereto is transmitted through a second set of birefringent elements which has orientations which are different from the orientations of birefringent elements which the output component from the first set of birefringent elements which is orthogonal to the input thereto is transmitted through in order for both the parallel component and the orthogonal component to have substantially zero dispersion after passing through both sets of birefringent elements. That is, if both output components from the first set of birefringent elements pass through a second set of birefringent elements having one set of the angular orientations $90°-\phi_3$, $90°-\phi_2$ and $90°-\phi_1$ or $90°+\phi_3$, $90°+\phi_2$ and $90°+\phi_1$ (with respect to the input polarization direction of light input to the second set of birefringent elements), then only one of the two components (the component which is parallel to the input to the first set of birefringent elements) will have approximately zero dispersion. Thus, it is necessary for the output component of the first set of birefringent elements which is parallel to the input thereto to be transmitted through a second set of birefringent elements having orientations of either $90°-\phi_3$, $90°-\phi_2$ and $90°-\phi_1$ or $90°+\phi_3$, $90°+\phi_2$ and $90°+\phi_1$ (with respect to the input polarization direction of light input to the second set of birefringent elements) and for the output component of first set of birefringent elements which is orthogonal to the input thereto to transmitted through a set of birefringent elements having orientations of either $\phi_3$, $\phi_2$, and $\phi_1$ or $-\phi_3$, $-\phi_2$ and $-\phi_1$ (with respect to the input polarization direction of light input to the second set of birefringent elements) in order for both components to have approximately zero dispersion.

For the fourth configuration, wherein the first set of birefringent elements has phase delays of $2\Gamma$, $2\Gamma$, and $\Gamma$, and the second set of birefringent elements has phase delays of $\Gamma$, $2\Gamma$, and $2\Gamma$, the output component of the first set of birefringent elements which is parallel to the input thereto is transmitted through a second set of birefringent elements which has orientations which are different from the orientations of the birefringent elements which the output component from the first set for birefringent elements which is orthogonal to the input thereto is transmitted through in order for both the parallel component and the orthogonal component to have substantially zero dispersion after having passing through both sets of birefringent elements. That is, if both output components from the first set of birefringent elements pass through a second set of birefringent elements having one set of the angular orientations $90°-\phi_1$, $90°-\phi_2$ and $90°-\phi_3$ or $90°+\phi_1$, $90°+\phi_2$ and $90°+\phi_3$ (with respect to the input polarization direction of light input to the second set of birefringent elements), then only one of the two components (the component which is parallel to the input to the first set of birefringent elements) will have approximately zero dispersion. Thus, it is necessary for the output component for the first set of birefringent elements which is parallel to the input thereto to be transmitted through a second set of birefringent elements having orientations of either $90°-\phi_1$, $90°-\phi_2$ and $90°-\phi_3$ or $90°+\phi_1$, $90°+\phi_2$ and $90°+\phi_3$ (with respect to the input polarization direction of light input to the second set of birefringent elements) and for the output component of the first set of birefringent elements which is orthogonal to the input thereto to be transmitted through a set of birefringent elements having orientations of either $\phi_1$, $\phi_2$ and $\phi_3$ or $-\phi_1$, $-\phi_2$, and $-\phi_3$ (with respect to the input polarization direction of light input to the second set of birefringent elements) in order for both components to have approximately zero dispersion.

Thus, if the order of the phase delays for the first set of birefringent elements is the same as the order of the phase delays for the second set of birefringent elements, then both components output from the first set of birefringent elements are transmitted through a second set of birefringent elements having one set of orientations $90°-\phi_1$, $90°-\phi_2$ and $90°-\phi_3$ or $90°+\phi_1$, $90°+\phi_2$ and $90°+\phi_3$ (with respect to the input polarization direction of light input to the second set of birefringent elements). However, if the first set of birefringent elements has an order of phase delays which is opposite to that of the second set of birefringent elements (such as the first set of birefringent elements having phase delays of $\Gamma$, $2\Gamma$, and $2\Gamma$ and the second set of birefringent elements having phase delays of $2\Gamma$, $2\Gamma$, and $\Gamma$ or the first set of birefringent elements having phase delays of $2\Gamma$, $2\Gamma$, and $\Gamma$ and the second set of birefringent elements having phase delays of $\Gamma$, $2\Gamma$, and $2\Gamma$), then the two output components from the first set of birefringent elements must each be transmitted through at least one second set of birefringent elements such that angular orientations of the birefringent elements in the second set are different for the two components in order for both of the two components to have approximately zero dispersion.

Table I below summarizes the first stage phase delays, first stage orientations, second stage phase delays, and second stage orientations for each of the four configurations discussed above.

TABLE I

| First Stage Phase Delays | First Stage Orientations | Second Stage Phase Delays | Second Stage Orientations |
|---|---|---|---|
| $\Gamma$, $2\Gamma$, $2\Gamma$ | $\phi_1$, $\phi_2$, $\phi_3$ | $\Gamma$, $2\Gamma$, $2\Gamma$ | $90° \pm \phi_1$, $90° \pm \phi_2$, $90° \pm \phi_3$ (parallel component) $90° \pm \phi_1$, $90° \pm \phi_2$, $90° \pm \phi_3$ (orthogonal component) |
| $2\Gamma$, $2\Gamma$, $\Gamma$ | $\phi_3$, $\phi_2$, $\phi_1$ | $2\Gamma$, $2\Gamma$, $\Gamma$ | $90° \pm \phi_3$, $90° \pm \phi_2$, $90° \pm \phi_1$ (parallel component) $90° \pm \phi_3$, $90° \pm \phi_2$, $90° \pm \phi_1$ (orthogonal component) |
| $\Gamma$, $2\Gamma$, $2\Gamma$ | $\phi_1$, $\phi_2$, $\phi_3$ | $2\Gamma$, $2\Gamma$, $\Gamma$ | $90° \pm \phi_3$, $90° \pm \phi_2$, $90° \pm \phi_1$ (parallel component) $\pm\phi_3$, $\pm\phi_2$, $\pm\phi_1$ (orthogonal component) |
| $2\Gamma$, $2\Gamma$, $\Gamma$ | $\phi_3$, $\phi_2$, $\phi_1$ | $\Gamma$, $2\Gamma$, $2\Gamma$ | $90° \pm \phi_1$, $90° \pm \phi_2$, $90° \pm \phi_3$ (parallel component) $\pm\phi_1$, $\pm\phi_2$, $\pm\phi_3$ (orthogonal component) |

The fourth column of Table I (entitled Second Stage Orientations) shows four sets of birefringent element orientations for each configuration. Two sets of angles for the parallel component are provided and two sets of angles for the orthogonal component are provided.

It is important to recognize that the first stage has two separate outputs or components. One of the two outputs or components from the first stage has a polarization direction which is parallel to the polarization direction of light that is input to the first stage and is therefore referred to herein as the parallel component. The other of the two outputs or components from the first stage has a polarization direction which is orthogonal to the polarization direction of light that is input to the first stage and is therefore referred to herein as the orthogonal component.

The output of the first stage is the input to the second stage. Therefore, the parallel component and the orthogonal component from the first stage are transmitted through birefringent elements of the second stage.

In some instances both the parallel component and the orthogonal component are transmitted through birefringent elements having the same angular orientations. From Table I above, this can be seen to occur when the phase delays of the first stage are in the same order as the phase delays of the second stage. When the phase delays of the first stage are reversed in order with respect to the phase delays of the second stage, then the parallel component and the orthogonal component are transmitted through birefringent elements having different angular orientations, as also shown in Table I.

As those skilled in the art will appreciate, transmitting the parallel component and the orthogonal component through birefringent elements having different angular orientations can be accomplished in various different ways. For example, the parallel component and the orthogonal component may be transmitted through two different sets of birefringent elements (which define the second stage), with each set having angular orientations which are appropriate for that component. Alternatively, polarization rotators (such as half-wave waveplates) may be used to align the parallel component and/or the orthogonal component such that the required orientation angles are provided and only a single set of birefringent elements is required for the second stage.

Although the table provided above lists three elements in each stage, similar results can be achieved by utilizing only two elements ($\Gamma$, $\phi_1$) and ($2\Gamma$, $\phi_2$). Generally, when only two elements are utilized, the transmission characteristics will not be as good as the case for three elements. However, the lower cost of manufacturing such two element devices makes them desirable for some applications.

It is important to note that where the $\pm$ is used in the table above, for a particular output component from the first stage (either the parallel component or the orthogonal component) the sign will be either + for all three values or – for all three values. For example, the first set of second stage orientations will always be either $90°+\phi_1$, $90°+\phi_2$, and $90°+\phi_3$, or $90°-\phi_1$, $90°-\phi_2$, and $90°-\phi_3$ for the parallel component and will never have mixed signs such as $90°+\phi_1$, $90°-\phi_2$, and $90°+\phi_3$.

In addition to manipulating the angular orientation of birefringent elements in the first and second stages of an interleaver or the like so as to provide approximately zero dispersion, it is also possible to manipulate the phase delays of the birefringent elements so as to provide approximately zero dispersion. Thus, various combinations of angular orientations of the birefringent elements and phase delays thereof may be utilized so as to provide approximately zero dispersion.

Varying the phase delay of the birefringent elements in the first and/or second stages of an interleaver or the like provides added flexibility in the manner in which i approximately zero dispersion may be obtained. This added flexibility may be utilized to provide ease in manufacturing and/or reduced assembly costs.

Table II below summarizes the first stage phase delays, first stage orientations, second stage phase delays, and second stage orientations for exemplary configurations of an optical interleaver wherein various phase delays are utilized in the first stage and the second stage to obtain approximately zero dispersion.

TABLE II

| First Stage Phase Delays | First Stage Orientations | Second Stage Phase Delays | Second Stage Orientations |
|---|---|---|---|
| $\Gamma + 2m_1 \pi$, $2\Gamma + 2m_2 \pi$, $2\Gamma + 2m_3 \pi$ | $\phi_1, \phi_2, \phi_3$ | $\Gamma + 2k_1 \pi$, $2\Gamma + 2k_2 \pi$, $2\Gamma + 2k_3 \pi$ | $90° \pm \phi_1, 90° \pm \phi_2, 90° \pm \phi_3$ (parallel component) $90° \pm \phi_1, 90° \pm \phi_2, 90° \pm \phi_3$ (orthogonal component) |
| $\Gamma + 2m_1 \pi$, $2\Gamma + 2m_2 \pi$, $2\Gamma + 2m_3 \pi$ | $\phi_1, \phi_2, \phi_3$ | $2\Gamma + 2k_3 \pi$, $2\Gamma + 2k_2 \pi$, $\Gamma + 2k_1 \pi$ | $90° \pm \phi_3, 90° \pm \phi_2, 90° \pm \phi_1$ (parallel component) $\pm\phi_3, \pm\phi_2, \pm\phi_1$ (orthogonal component) |
| $\Gamma + 2m_1 \pi$, $2\Gamma + 2m_2 \pi$, $2\Gamma + 2m_3 \pi$ | $\phi_1, \phi_2, \phi_3$ | $\Gamma + (2k_1 + 1) \pi$, $2\Gamma + 2k_2 \pi$, $2\Gamma + 2k_3 \pi$ | $\pm\phi_1, \pm\phi_2, \pm\phi_3$ (parallel component) $\pm\phi_1, \pm\phi_2, \pm\phi_3$ (orthogonal component) |
| $\Gamma + 2m_1 \pi$, $2\Gamma + 2m_2 \pi$, $2\Gamma + 2m_3 \pi$ | $\phi_1, \phi_2, \phi_3$ | $2\Gamma + 2k_3 \pi$, $2\Gamma + 2k_2 \pi$, $\Gamma + (2k_1 + 1) \pi$ | $90° \pm \phi_3, 90° \pm \phi_2, 90° \pm \phi_1$ (parallel component) $\pm\phi_3, \pm\phi_2, \pm\phi_1$ (orthogonal component) |
| $2\Gamma + 2m_3 \pi$, $2\Gamma + 2m_2 \pi$, $\Gamma + 2m_1 \pi$ | $\phi_3, \phi_2, \phi_1$ | $2\Gamma + 2k_3 \pi$, $2\Gamma + 2k_2 \pi$, $\Gamma + 2k_1 \pi$ | $90° \pm \phi_3, 90° \pm \phi_2, 90° \pm \phi_1$ (parallel component) $90° \pm \phi_3, 90° \pm \phi_2, 90° \pm \phi_1$ (orthogonal component) |
| $2\Gamma + 2m_3 \pi$, $2\Gamma + 2m_2 \pi$, $\Gamma + 2m_1 \pi$ | $\phi_3, \phi_2, \phi_1$ | $\Gamma + 2k_1 \pi$, $2\Gamma + 2k_2 \pi$, $2\Gamma + 2k_3 \pi$ | $90° \pm \phi_1, 90° \pm \phi_2, 90° \pm \phi_3$ (parallel component) $\pm\phi_1, \pm\phi_2, \pm\phi_3$ (orthogonal component) |
| $2\Gamma + 2m_3 \pi$, $2\Gamma + 2m_2 \pi$, $\Gamma + 2m_1 \pi$ | $\phi_3, \phi_2, \phi_1$ | $\Gamma + (2k_1 + 1) \pi$, $2\Gamma + 2k_2 \pi$, $2\Gamma + 2k_3 \pi$ | $\pm\phi_1, \pm\phi_2, \pm\phi_3$ (parallel component) $90° \pm \phi_1, 90° \pm \phi_2, 90° \pm \phi_3$ (orthogonal component) |
| $2\Gamma + 2m_3 \pi$, $2\Gamma + 2m_2 \pi$, $2\Gamma + 2m_1 \pi$ | $\phi_3, \phi_2, \phi_1$ | $2\Gamma + 2k_3 \pi$, $2\Gamma + 2k_2 \pi$, $\Gamma + (2k_1 + 1) \pi$ | $90° \pm \phi_3, 90° \pm \phi_2, 90° \pm \phi_1$ (parallel component) $90° \pm \phi_3, 90° \pm \phi_2, 90° \pm \phi_1$ (orthogonal component) |
| $\Gamma + (2m_1 + 1) \pi$, $2\Gamma + 2m_2 \pi$, $2\Gamma + 2m_3 \pi$ | $\phi_1, \phi_2, \phi_3$ | $\Gamma + 2k_1 \pi$, $2\Gamma + 2k_2 \pi$, $2\Gamma + 2k_3 \pi$ | $\pm\phi_1, \pm\phi_2, \pm\phi_3$ (parallel component) $\pm\phi_1, \pm\phi_2, \pm\phi_3$ (orthogonal component) |
| $\Gamma + (2m_1 + 1) \pi$, $2\Gamma + 2m_2 \pi$, $2\Gamma + 2m_3 \pi$ | $\phi_1, \phi_2, \phi_3$ | $2\Gamma + 2k_3 \pi$, $2\Gamma + 2k_2 \pi$, $\Gamma + 2k_1 \pi$ | $90° \pm \phi_3, 90° \pm \phi_2, 90° \pm \phi_1$ (parallel component) $\pm\phi_3, \pm\phi_2, \pm\phi_1$ (orthogonal component) |
| $\Gamma + (2m_1 + 1) \pi$, $2\Gamma + 2m_2 \pi$, $2\Gamma + 2m_3 \pi$ | $\phi_1, \phi_2, \phi_3$ | $\Gamma + (2k_1 + 1) \pi$, $2\Gamma + 2k_2 \pi$, $2\Gamma + 2k_3 \pi$ | $90° \pm \phi_1, 90° \pm \phi_2, 90° \pm \phi_3$ (parallel component) $90° \pm \phi_1, 90° \pm \phi_2, 90° \pm \phi_3$ (orthogonal component) |
| $\Gamma + (2m_1 + 1) \pi$, $2\Gamma + 2m_2 \pi$, $2\Gamma + 2m_3 \pi$ | $\phi_1, \phi_2, \phi_3$ | $2\Gamma + 2k_3 \pi$, $2\Gamma + 2k_2 \pi$, $\Gamma + (2k_1 + 1) \pi$ | $90° \pm \phi_3, 90° \pm \phi_2, 90° \pm \phi_1$ (parallel component) $\pm\phi_3, \pm\phi_2, \pm\phi_1$ (orthogonal component) |
| $2\Gamma + 2m_3 \pi$, $2\Gamma + 2m_2 \pi$, $\Gamma + (2m_1 + 1) \pi$ | $\phi_3, \phi_2, \phi_1$ | $\Gamma + 2k_1 \pi$, $2\Gamma + 2k_2 \pi$, $2\Gamma + 2k_3 \pi$ | $\pm\phi_1, \pm\phi_2, \pm\phi_3$ (parallel component) $90° \pm \phi_1, 90° \pm \phi_2, 90° \pm \phi_3$ (orthogonal component) |
| $2\Gamma + 2m_3 \pi$, $2\Gamma + 2m_2 \pi$, $\Gamma + (2m_1 + 1) \pi$ | $\phi_3, \phi_2, \phi_1$ | $2\Gamma + 2k_3 \pi$, $2\Gamma + 2k_2 \pi$, $\Gamma + 2k_1 \pi$ | $90° \pm \phi_3, 90° \pm \phi_2, 90° \pm \phi_1$ (parallel component) $90° \pm \phi_3, 90° \pm \phi_2, 90° \pm \phi_1$ (orthogonal component) |
| $2\Gamma + 2m_1 \pi$, $2\Gamma + 2m_2 \pi$, $\Gamma + (2m_1 + 1) \pi$ | $\phi_3, \phi_2, \phi_1$ | $\Gamma + (2k_1 + 1) \pi$, $2\Gamma + 2k_2 \pi$, $2\Gamma + 2k_3 \pi$ | $90° \pm \phi_1, 90° \pm \phi_2, 90° \pm \phi_3$ (parallel component) $\pm\phi_1, \pm\phi_2, \pm\phi_3$ (orthogonal component) |
| $2\Gamma + 2m_3 \pi$, $2\Gamma + 2m_2 \pi$, $\Gamma + (2m_1 + 1) \pi$ | $\phi_3, \phi_2, \phi_1$ | $2\Gamma + 2k_3 \pi$, $2\Gamma + 2k_2 \pi$, $\Gamma + (2k_1 + 1) \pi$ | $90° \pm \phi_3, 90° \pm \phi_2, 90° \pm \phi_1$ (parallel component) $90° \pm \phi_3, 90° \pm \phi_2, 90° \pm \phi_1$ (orthogonal component) |

Wherein $m_1$, $M_2$, $M_3$, $k_1$, $k_2$, $k_3$ are integers (0, ±1, ±2, . . . )

As discussed above with respect to Table I, Table II also shows four sets of birefringent element orientations for each configuration. This is again necessary because the two different output components (the parallel component and the orthogonal component) from the first stage will, in some instances, be transmitted through birefringent elements of the second stage where the orientation angles are different for the parallel component and the orthogonal component.

If the phase delay of the element having the smallest phase delay of a stage is increased by π [or nπ, where n is an odd number], then the transmission characteristics of the parallel component and the orthogonal component are swapped (which means that the odd channels and the even channels are swapped) and the dispersion characteristics of the parallel component and the orthogonal component are unchanged. That is, the transmission curve shifts such that the stopband becomes the passband and the passband becomes the stopband. The dispersion curves shifts such that the dispersion curve for each new passband is the same as the dispersion curve for each passbond prior to the shift. The effect is the same for both odd and even channels.

The different configurations of the present invention, wherein a first stage having three birefringent elements cooperates with a second stage also having three birefringent elements so as to facilitate the construction of a device such as optical interleaver which has approximately zero dispersion, are summarized more generally in Table III. This table contains those configurations wherein approximately zero dispersion is obtained by varying the orientation of the birefringent elements of the second stage with respect to those of the first stage, varying the phase delays of the birefringent elements of the first and/or second stage, and by varying both the orientations of the birefringent elements of the second stage with respect to the first stage and the phase delays of the first and/or second stage.

TABLE III

| First Stage Phase Delays | First Stage Orientations | Second Stage Phase Delays | Second Stage Orientations |
|---|---|---|---|
| $\Gamma + 2m_1\pi$, $2\Gamma + 2m_2\pi$, $2\Gamma + 2m_3\pi$ | $\phi_1, \phi_2, \phi_3$ | $\Gamma' + 2k_1\pi$, $2\Gamma' + 2k_2\pi$, $2\Gamma' + 2k_3\pi$ | $90° \pm \phi_1, 90° \pm \phi_2, 90° \pm \phi_3$ (parallel component) $90° \pm \phi_1, 90° \pm \phi_2, 90° \pm \phi_3$ (orthogonal component) where $\Gamma - \Gamma' = 2l$ |
| $\Gamma + 2m_1\pi$, $2\Gamma + 2m_2\pi$, $2\Gamma + 2m_3\pi$ | $\phi_1, \phi_2, \phi_3$ | $\Gamma' + 2k_1\pi$, $2\Gamma' + 2k_2\pi$, $2\Gamma' + 2k_3\pi$ | $\pm\phi_1, \pm\phi_2, \pm\phi_3$ (parallel component) $\pm\phi_1, \pm\phi_2, \pm\phi_3$ (orthogonal component) where $\Gamma - \Gamma' = (2l + 1)$ |
| $\Gamma + 2m_1\pi$, $2\Gamma + 2m_2\pi$, $2\Gamma + 2m_3\pi$ | $\phi_1, \phi_2, \phi_3$ | $2\Gamma' + 2k_2\pi$, $2\Gamma' + 2k_2\pi$, $\Gamma' + 2k_1\pi$ | $90° \pm \phi_3, 90° \pm \phi_2, 90° \pm \phi_1$ (parallel component) $\pm\phi_1, \pm\phi_2, \pm\phi_3$ (orthogonal component) where $\Gamma - \Gamma' = 2l$ |
| $\Gamma + 2m_1\pi$, $2\Gamma + 2m_2\pi$, $2\Gamma + 2m_3\pi$ | $\phi_1, \phi_2, \phi_3$ | $2\Gamma' + 2k_3\pi$, $2\Gamma' + 2k_2\pi$, $\Gamma' + 2k_1\pi$ | $90° \pm \phi_3, 90° \pm \phi_2, 90° \pm \phi_1$ (parallel component) $\pm\phi_3, \pm\phi_2, \pm\phi_1$ (orthogonal component) where $\Gamma - \Gamma' = (2l + 1)$ |
| $2\Gamma + 2m_3\pi$, $2\Gamma + 2m_2\pi$, $\Gamma + 2m_1\pi$ | $\phi_3, \phi_2, \phi_1$ | $2\Gamma' + 2k_3\pi$, $2\Gamma' + 2k_2\pi$, $\Gamma' + 2k_1\pi$ | $90° \pm \phi_3, 90° \pm \phi_2, 90° \pm \phi_1$ (parallel component) $90° \pm \phi_3, 90° \pm \phi_2, 90° \pm \phi_1$ (orthogonal component) where $\Gamma - \Gamma' = 2l$ |
| $2\Gamma + 2m_3\pi$, $2\Gamma + 2m_2\pi$, $\Gamma + 2m_1\pi$ | $\phi_3, \phi_2, \phi_1$ | $2\Gamma' + 2k_3\pi$, $2\Gamma' + 2k_2\pi$, $\Gamma' + 2k_3\pi$ | $90° \pm \phi_3, 90° \pm \phi_2, 90° \pm \phi_1$ (parallel component) $90° \pm \phi_3, 90° \pm \phi_2, 90° \pm \phi_1$ (orthogonal component) where $\Gamma - \Gamma' = (2l + 1)$ |
| $2\Gamma + 2m_3\pi$, $2\Gamma + 2m_2\pi$, $\Gamma + 2m_1\pi$ | $\phi_3, \phi_2, \phi_1$ | $\Gamma' + 2k_1\pi$, $2\Gamma' + 2k_2\pi$, $2\Gamma' + 2k_3\pi$ | $90° \pm \phi_1, 90° \pm \phi_2, 90° \pm \phi_3$ (parallel component) $\pm\phi_1, \pm\phi_2, \pm\phi_3$ (orthogonal component) where $\Gamma - \Gamma' = 2l$ |
| $2\Gamma + 2m_3\pi$, $2\Gamma + 2m_2\pi$, $\Gamma + 2m_1\pi$ | $\phi_3, \phi_2, \phi_1$ | $\Gamma' + 2k_1\pi$, $2\Gamma' + 2k_2\pi$, $2\Gamma' + 2k_3\pi$ | $\pm\phi_1, \pm\phi_2, \pm\phi_3$ (parallel component) $90° \pm \phi_1, 90° \pm \phi_2, 90° \pm \phi_3$ (orthogonal component) where $\Gamma - \Gamma' = (2l + 1)$ |

As discussed above with respect to Table I, Table III also shows four sets of birefringent element orientations for each configuration. This is again necessary because the two different output components (the parallel component and the orthogonal component) from the first stage will, in some instances, be transmitted through birefringent elements of the second stage where the orientation angles are different for the parallel component and the orthogonal component.

Phase retardations $\Gamma$ and $\Gamma'$ are a measure of the relative change in phase and are wavelength dependent in general. However, in the close range of the interested wavelengths (1550 nm for example), a small amount of phase change can be considered as wavelength independent. A full wavelength shift in optical path length can be considered as $2\pi$ in phase shift. This assumption give the simplicity to treat the mathematic formulas without introducing unacceptable errors. Considering all parameters used in all tables, it is typical that $2m_1\pi$, $2m_2\pi$, $2m_3\pi$, $2k_1\pi$, $2k_2\pi$, $2k_3\pi$ and $2l\pi << \Gamma$ and $\Gamma'$.

All tables listed above have three elements in each stage. However, similar results apply to two elements stage as well. For example, the third birefringent element in each case can be removed and the table is still true.

Tables I, II and III define the parameters used to construct a zero or approximately zero dispersion interleaver. Each table defines the relevant parameters, i.e., the phase delays and birefringent element orientations, for both the first stage and second stage of a two stage interleaver. These parameters are selected so as to define first and second stages which have dispersion versus wavelength curves that are flipped with respect to one another for the same passband. Thus, the second stage of an interleaver formed according to Tables I, II, or III tends to cancel or substantially mitigate the dispersion introduced by the first stage and such a two stage interleaver. Thus, Tables I, II and III define the rules for constructing low dispersion interleavers according to the present invention.

As mentioned above, birefringent devices, other than birefringent crystals, may alternatively be utilized. When birefringent devices other than birefringent crystals are utilized, then the angular orientations of the birefringent devices can be converted to relative angles between the optical beam polarization direction and the equivalent fast axes of such birefringent devices.

One example of a birefringent device which does not utilize birefringent crystals is a device wherein an incoming composite optical beam is separated into two generally orthogonally polarized optical beams and each of the two generally orthogonally polarized beams travel over different optical path lengths prior to being recombined, so as to obtain a birefringent effect.

In each of the examples above, a 50 GHz interleaver is utilized as an example. Those skilled in the art will appreciate that the use of a 50 GHz interleaver as an example by way of illustration only, and not by way of limitation.

Although most examples discussed above utilize equivalent birefringent element orientations angles of 45°, −21° and 7° and utilize phase delays of $\Gamma$, $2\Gamma$ and $2\Gamma$, those skilled in the art will appreciate that various other angles and phase delays are likewise suitable. For example, phase delays of $\Gamma$, $2\Gamma$ and $\Gamma$ may alternatively be utilized.

The interleavers described herein are suitable for demultiplexing optical signals. Those skilled in the art will appreciate similar structures may be utilized to multiplex optical signals.

As those skilled in the art will appreciate, the waveplates which are utilized in the present invention can optionally be omitted in some instances by rotating subsequent components appropriately. Further, various devices and/or materials may alternatively be utilized to orient the polarization direction of light beams. For example, devices and/or materials which are responsive to applied voltages, currents, magnetic fields and/or electrical fields may be used to orient the polarization direction of light beams. Thus, the use of waveplates herein is by way of example only, and not by way of limitations.

Further, when waveplates having identical orientations are dispose next to one another, then a common waveplate may be substituted therefor.

It is understood that the exemplary low dispersion interleaver described herein and shown in the drawings represents only presently preferred embodiments of the invention. Indeed, various modifications and additions may be made to such embodiments without departing from the spirit and scope of the invention. For example, the stages of the low dispersion interleaver of the present invention need not comprise substantially identical devices, but rather may comprise any two devices having generally flipped or opposite dispersion curves with respect to one another. Thus, the first stage may comprise birefringent crystals while the second stage comprises spatial birefringent devices. Further, birefringent elements having various different angular orientations and/or phase delays may be utilized. Thus, these and other modifications and additions may be obvious to those skilled in the art and may be implemented to the present invention for use in a variety of different applications.

What is claimed is:

1. An interleaver comprising:
   a first birefringent element assembly comprising first, second, and third birefringent elements;
   a second birefringent element assembly comprising fourth, fifth and sixth birefringent elements;
   a polarization rotator configured to make two orthogonally polarized components of the first birefringent element assembly approximately parallel with respect to one another prior to the two polarization components being incident upon the second birefringent element assembly;
   wherein the second birefringent element assembly has an order of phase delays of the fourth, fifth and sixth elements being the same as an order of phase delays of the first, second and third elements of the first birefringent element assembly;
   wherein the first, second and third birefringent elements have angular orientations of $\phi_1$, $\phi_2$, and $\phi_3$, respectively; and
   wherein the fourth, fifth, and sixth birefringent elements have angular orientations selected from the group consisting of: $90°-\phi_1$, $90°-\phi_2$, and $90°-\phi_3$; and $90°-\phi_1$, $90°+\phi_2$, and $90°+\phi_3$.

2. An interleaver comprising:
   a first birefringent element assembly comprising first, second, and third birefringent elements;
   a second birefringent element assembly comprising fourth, fifth and sixth birefringent elements;
   a polarization rotator configured to make two orthogonally polarized components of the first birefringent element assembly approximately parallel with respect to one another prior to the two polarization components being incident upon the second birefringent element assembly;
   wherein the second birefringent element assembly has an order of phase delays of the fourth, fifth and sixth elements being the same as an order of phase delays of the first, second and third elements of the first birefringent element assembly;
   wherein the first birefringent element assembly comprises a first birefringent element having an angular orientation of +, a second birefringent element having an angular orientation of X and a third birefringent element having an angular orientation of $\phi_3$;
   wherein the second birefringent element assembly comprises birefringent elements selected from the group consisting of:
      a fourth birefringent element having an angular orientation of $90°-\phi_1$, a fifth birefringent element having an angular orientation of $90°-\phi_2$ and a sixth birefringeint element having an angular orientation of $90°-\phi_3$; and a fourth birefringent element having an angular orientation of $90°+\phi_1$, a fifth birefringent element having an angular orientation of $90°+\phi_2$ and a sixth birefringent element having an angular orientation of $90°+\phi_3$;
   wherein an order of the first birefringent element, second birefringent element, third birefringent element, fourth birefringent element, fifth birefringent element and sixth birefringent element, from input to output of the interleaver, is selected from the group consisting of:
      first birefringent element, second birefringent element, third birefringent element, fourth birefringent element, fifth birefringent element and sixth birefringent element; third birefringent element, second birefringent element, first birefringent element, sixth birefringent element, fifth birefringent element and fourth birefringent element; and
   wherein the angular orientations are with respect to a polarization direction of light entering the birefringent element assembly within which a birefringent element is contained.

3. An interleaver comprising:
   a first birefringent element assembly comprising first, second, and third birefringent elements;
   a second birefringent element assembly comprising fourth, fifth and sixth birefringent elements;
   wherein the first birefringent element assembly comprises a first birefringent element having an angular orientation of $\phi_1$, a second birefringent element having an angular orientation of $\phi_2$ and a third birefringent element having an angular orientation of $\phi_3$;
   wherein the second birefringent element assembly comprises birefringent elements selected from the group consisting of:
      a fourth birefringent element having an angular orientation of $90°-\phi_1$ a fifth birefringent element having an angular orientation of $90°-\phi_2$ and a sixth birefringent element having an angular orientation of $90°-\phi_3$; and a fourth birefringent element having an angular orientation of $90°+\phi_1$, a fifth birefringent element having an angular orientation of $90°+\phi_2$ and a sixth birefringent element having an angular orientation of $90°+\phi_3$;
   wherein an order of the first birefringent element, second birefringent element, third birefringent element, fourth bireffingent element, fifth birefringent element and sixth birefringent element, from input to output of the interleaver, is selected from the group consisting of:
      first birefringent element, second birefringent element, third birefringent element, fourth birefringent element, fifth birefringent element and sixth birefringent element; third birefringent element, second birefringent element, first birefringent element, sixth birefringent element, fifth birefringent element and fourth birefringent element; and
   wherein the angular orientations are with respect to a polarization direction of light entering the birefringent element assembly within which a birefringent element is contained.

4. An interleaver comprising:
   a first birefringent element assembly comprising first, second, and third birefringent elements;
   a second birefringent element assembly comprising fourth, fifth and sixth birefringent elements;
   wherein the second birefringent element assembly has an order of phase delays of the fourth, fifth and sixth birefringent elements being reversed with respect to an order of the phase delays of the first second and third birefringent elements of the first birefringent element assembly;

wherein two orthogonally polarized components, one orthogonally polarized component being a parallel component with respect to a polarization direction of light entering the first birefringent element assembly, of the first birefringent element assembly have polarization directions which are unchanged with respect to one another prior to being incident upon the second birefringent element assembly;

wherein the first birefringent element assembly comprises a first birefringent element having an angular orientation of $\phi_1$, a second birefringent element having an angular orientation of $\phi_2$ and a third birefringent element having an angular orientation of $\phi_3$;

wherein the second birefringent element assembly comprises birefringent elements selected from the group consisting of: a fourth birefringent element having an angular orientation of $90°-\phi_3$, a fifth birefringent element having an angular orientation of $90°-\phi_2$ and a sixth birefringent element having an angular orientation of $90°-\phi_1$ with respect to polarization direction of the parallel component; and a fourth birefringent element having an angular orientation of $90°+\phi_3$, a fifth birefringent element having an angular orientation of $90°+\phi_2$ and a sixth birefringent element having an angular orientation of $90°+\phi_1$ with respect to polarization direction of the parallel component; and wherein an order of the first birefringent element, second birefringent element, third birefringent element, fourth birefringent element, fifth birefringent element and sixth birefringent element, from input to output of the interleaver, is selected from the group consisting of: first birefringent element, second birefringent element, third birefringent element, fourth birefringent element, fifth birefringent element and sixth birefringent element; and third birefringent element, second birefringent element, first birefringent element, sixth birefringent element, fifth birefringent element and fourth birefringent element.

5. An interleaver comprising:

a first birefringent element assembly comprising first, second, and third birefringent elements;

a second birefringent element assembly comprising fourth, fifth and sixth birefringent elements; and wherein phase delays and angular orientations for birefringent elements of the first and second birefringent element assemblies are selected from the table III.

* * * * *